(12) United States Patent
Coban et al.

(10) Patent No.: US 9,055,304 B2
(45) Date of Patent: Jun. 9, 2015

(54) REDUCED RESOLUTION PIXEL INTERPOLATION

(75) Inventors: Muhammed Zeyd Coban, Carlsbad, CA (US); Peisong Chen, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 391 days.

(21) Appl. No.: 13/536,484

(22) Filed: Jun. 28, 2012

(65) Prior Publication Data

US 2013/0010865 A1    Jan. 10, 2013

Related U.S. Application Data

(60) Provisional application No. 61/504,149, filed on Jul. 1, 2011, provisional application No. 61/506,016, filed on Jul. 8, 2011, provisional application No. 61/506,059, filed on Jul. 9, 2011, provisional application No. 61/507,564, filed on Jul. 13, 2011, provisional application No. 61/549,131, filed on Oct. 19, 2011.

(51) Int. Cl.
| | |
|---|---|
| H04N 7/32 | (2006.01) |
| H04N 19/59 | (2014.01) |
| H04N 19/117 | (2014.01) |
| H04N 19/156 | (2014.01) |
| H04N 19/184 | (2014.01) |
| H04N 19/43 | (2014.01) |

(52) U.S. Cl.
CPC ............. *H04N 19/59* (2014.11); *H04N 19/117* (2014.11); *H04N 19/156* (2014.11); *H04N 19/184* (2014.11); *H04N 19/43* (2014.11)

(58) Field of Classification Search
CPC .................. H04N 19/00066; H04N 19/00757; H04N 19/00309; H04N 19/00509; H04N 19/00206; H04N 19/00781; H04N 19/00569; H04N 19/00696
USPC ...................................................... 375/240.12
See application file for complete search history.

(56) References Cited

U.S. PATENT DOCUMENTS

| | | | | |
|---|---|---|---|---|
| 5,488,419 | A | * | 1/1996 | Hui et al. ................. 375/240.17 |
| 6,125,201 | A | * | 9/2000 | Zador ............................ 382/166 |
| 6,965,644 | B2 | | 11/2005 | Fandrianto et al. |
| 7,499,492 | B1 | | 3/2009 | Ameres et al. |
| 7,620,109 | B2 | | 11/2009 | Srinivasan |
| 8,705,628 | B2 | * | 4/2014 | Tanaka ...................... 375/240.16 |
| 8,767,817 | B1 | * | 7/2014 | Xu et al. ........................ 375/240 |

(Continued)

FOREIGN PATENT DOCUMENTS

EP    1353514 A2    10/2003

OTHER PUBLICATIONS

Wiegand et al, WD3: Working Draft 3 of High-Efficiency Video Coding, Mar. 29, 2011.*

(Continued)

*Primary Examiner* — Shan Elahi
(74) *Attorney, Agent, or Firm* — Shumaker & Sieffert, P.A.

(57) ABSTRACT

An offset can be applied to intermediate values obtained while performing an interpolation filtering operation such that applying the offset reduces the bitdepth of the intermediate value. The intermediate value can be stored with the reduced bitdepth, and when retrieved, the offset can be added back such that future calculation can be performed using the intermediate value with the original bitdepth.

25 Claims, 11 Drawing Sheets

(56) References Cited

U.S. PATENT DOCUMENTS

| | | | |
|---|---|---|---|
| 8,798,131 B1* | 8/2014 | Bankoski et al. | 375/240 |
| 8,842,723 B2* | 9/2014 | Zhang et al. | 375/240 |
| 2003/0202607 A1* | 10/2003 | Srinivasan | 375/240.29 |
| 2004/0022318 A1* | 2/2004 | Garrido et al. | 375/240.11 |
| 2005/0036552 A1* | 2/2005 | Takahashi et al. | 375/240.16 |
| 2005/0243931 A1 | 11/2005 | Yasuda et al. | |
| 2006/0055569 A1* | 3/2006 | Tomic | 341/50 |
| 2007/0242752 A1* | 10/2007 | Kuzuya | 375/240.16 |
| 2008/0049832 A1* | 2/2008 | Ozeki et al. | 375/240.02 |
| 2008/0120676 A1* | 5/2008 | Morad et al. | 725/127 |
| 2009/0092189 A1* | 4/2009 | Tsuchiya et al. | 375/240.16 |
| 2009/0097561 A1* | 4/2009 | Chiu et al. | 375/240.16 |
| 2009/0257499 A1 | 10/2009 | Karczewicz et al. | |
| 2010/0020866 A1* | 1/2010 | Marpe et al. | 375/240.02 |
| 2010/0027686 A1* | 2/2010 | Zuo et al. | 375/240.29 |
| 2010/0111182 A1* | 5/2010 | Karczewicz et al. | 375/240.16 |
| 2010/0260260 A1* | 10/2010 | Wiegand et al. | 375/240.12 |
| 2011/0116549 A1* | 5/2011 | Sun | 375/240.16 |
| 2012/0051434 A1* | 3/2012 | Blum | 375/240.16 |
| 2012/0314026 A1* | 12/2012 | Chen et al. | 348/43 |

OTHER PUBLICATIONS

Bross et al., "High efficiency video coding (HEVC) text specification draft 7," 9th Meeting: Geneva, CH, Apr. 27-May 7, 2012, JCTVC-I1003_d2, 290 pp.

Bross et al., "High efficiency video coding (HEVC) text specification draft 8," 10th Meeting: Stockholm, SE, Jul. 11-20, 2012, JCTVC-J1003_d7, 261 pp.

Bross et al., "High efficiency video coding (HEVC) text specification draft 6," 8th Meeting: San Jose, CA, USA, Feb. 1-10, 2012, JCTVC-H1003, 259 pp.

Bross et al., "WD4: Working Draft 4 of High-Efficiency Video Coding," 6th Meeting: JCTVC-F803_d2, Torino, IT, Jul. 14-22, 2011, 226 pp.

Bross et al., "WD5: Working Draft 5 of High-Efficiency Video Coding," 7th Meeting: Geneva, CH, Nov. 21-30, 2011, JCTVC-G1103_d2, 214 pp.

International Search Report and Written Opinion—PCT/US2012/045044—ISA/EPO—Sep. 10, 2012, 13 pp.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

Wiegand et al., "WD2: Working Draft 2 of High-Efficiency Video Coding," JCTVC-D503, 4th Meeting: Daegu, KR, Jan. 20-28, 2011, 153 pp.

Wiegand et al., "WD1: Working Draft 1 of High-Efficiency Video Coding," JCTVC-C403, 3rd Meeting: Guangzhou, CN, 7-15 Oct. 7-15, 2010, 137 pp.

Bross et al., "High Efficiency Video Coding (HEVC) text specification draft 9," 11th Meeting: Shanghai, CN, 10-19 Oct. 2012, JCTVC-K1003_v7, 290 pp.

Bross et al., "High Efficiency Video Coding (HEVC) text specification draft 10 (for FDIS & Last Call)," 12th Meeting: Geneva, CH, 14-23 Jan. 14-23 , 2013, JCTVC-L1003_v34, 310 pp.

ITU-T H.265, Series H: Audiovisual and Multimedia Systems, Infrastructure of audiovisual services—Coding of moving video, High efficiency video coding, The International Telecommunication Union. Apr. 2013, 317 pp.

Second Written Opinion from International Application No. PCT/US2012/045044, dated Jun. 3, 2013, 4 pp.

International Preliminary Report on Patentability from International Application No. PCT/US20121045044, dated Oct. 1, 2013, 16 pp.

Bossen, "On the motion compensation process," Joint Collaborative Team on Video Coding, JCTVC-F537, Jul. 14-22, 2011, 5 pp.

Bossen, "On the motion compensation process," Joint Collaborative Team on Video Coding, JCTVC-F537r1, Jul. 14-22, 2011, 7 pp.

Coban et al., "Luma/chroma interpolation precision," Joint Collaborative Team on Video Coding, JCTVC-F585, Jul. 14-22, 2011, 11 pp.

Coban et al., "Modification to JCTVC-F537: 16-bit bi-prediction interpolation process," Joint Collaborative Team on Video Coding, JCTVC-F733, Jul. 14-22, 2011, 7 pp.

International Telecommunication Union, "Advanced video coding for generic audiovisual services," H.264, Telecommunication Standardization Sector, Mar. 2010, 669 pp.

Wiegand et al., "WD3: Working Draft 3 of High-Efficiency Video Coding," Joint Collaborative Team on Video Coding, JCTVC-E603, Mar. 16-23, 2011, 231 pp.

* cited by examiner

FIG. 3

FIG. 6
FIG. 7

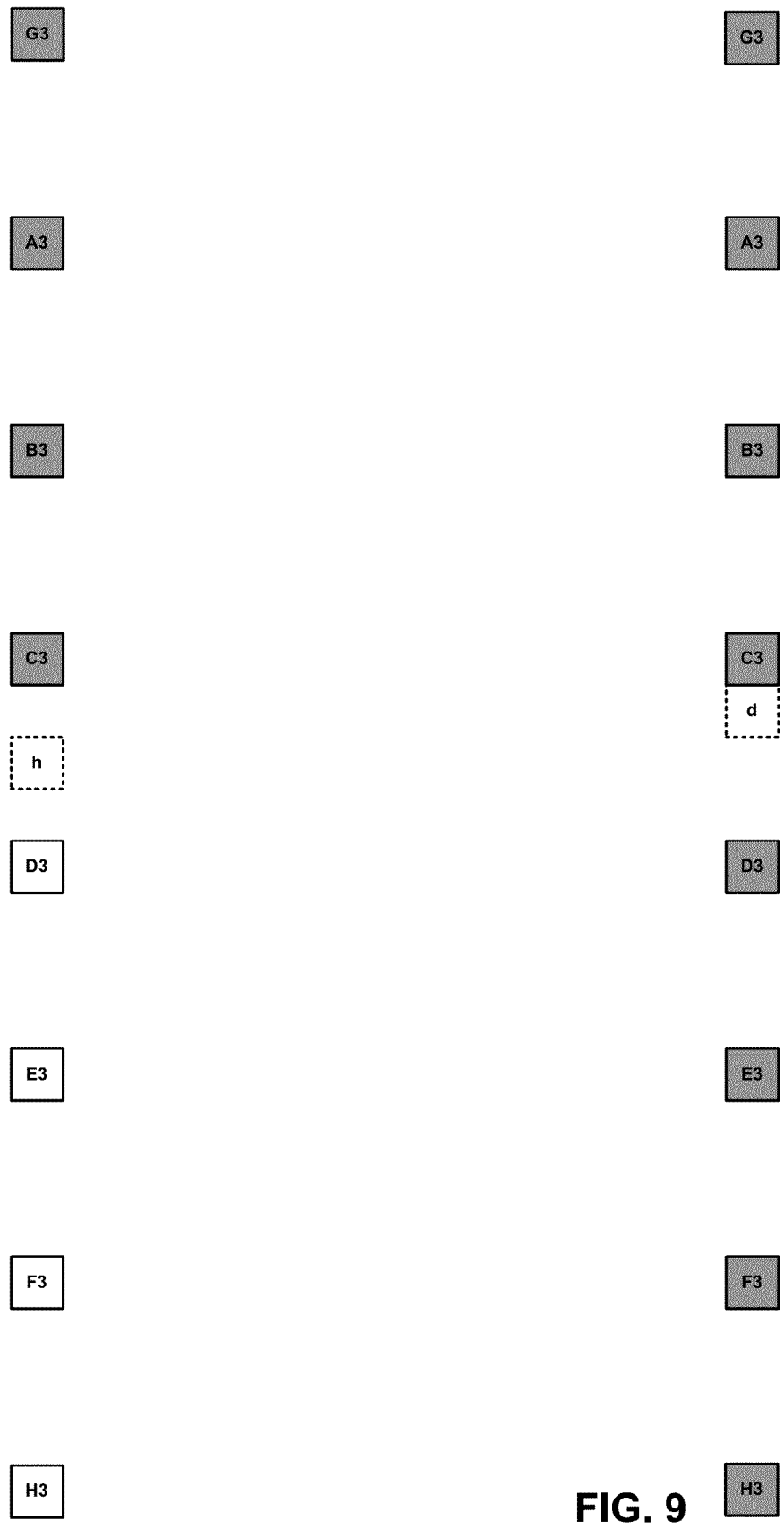
FIG. 8       FIG. 9 

FIG. 12

| | ha$_{0,-1}$ | hb$_{0,-1}$ | hc$_{0,-1}$ | hd$_{0,-1}$ | he$_{0,-1}$ | hf$_{0,-1}$ | hg$_{0,-1}$ | hh$_{0,-1}$ | |
|---|---|---|---|---|---|---|---|---|---|
| ah$_{-1,0}$ | B$_{0,0}$ | ab$_{0,0}$ | ac$_{0,0}$ | ad$_{0,0}$ | ae$_{0,0}$ | af$_{0,0}$ | ag$_{0,0}$ | ah$_{0,0}$ | B$_{1,0}$ |
| bh$_{-1,0}$ | ba$_{0,0}$ | bb$_{0,0}$ | bc$_{0,0}$ | bd$_{0,0}$ | be$_{0,0}$ | bf$_{0,0}$ | bg$_{0,0}$ | bh$_{0,0}$ | ba$_{1,0}$ |
| ch$_{-1,0}$ | ca$_{0,0}$ | cb$_{0,0}$ | cc$_{0,0}$ | cd$_{0,0}$ | ce$_{0,0}$ | cf$_{0,0}$ | cg$_{0,0}$ | ch$_{0,0}$ | ca$_{1,0}$ |
| dh$_{-1,0}$ | da$_{0,0}$ | db$_{0,0}$ | dc$_{0,0}$ | dd$_{0,0}$ | de$_{0,0}$ | df$_{0,0}$ | dg$_{0,0}$ | dh$_{0,0}$ | da$_{1,0}$ |
| eh$_{-1,0}$ | ea$_{0,0}$ | eb$_{0,0}$ | ec$_{0,0}$ | ed$_{0,0}$ | ee$_{0,0}$ | ef$_{0,0}$ | eg$_{0,0}$ | eh$_{0,0}$ | ea$_{1,0}$ |
| fh$_{-1,0}$ | fa$_{0,0}$ | fb$_{0,0}$ | fc$_{0,0}$ | fd$_{0,0}$ | fe$_{0,0}$ | ff$_{0,0}$ | fg$_{0,0}$ | fh$_{0,0}$ | fa$_{1,0}$ |
| gh$_{-1,0}$ | ga$_{0,0}$ | gb$_{0,0}$ | gc$_{0,0}$ | gd$_{0,0}$ | ge$_{0,0}$ | gf$_{0,0}$ | gg$_{0,0}$ | gh$_{0,0}$ | ga$_{1,0}$ |
| hh$_{-1,0}$ | ha$_{0,0}$ | hb$_{0,0}$ | hc$_{0,0}$ | hd$_{0,0}$ | he$_{0,0}$ | hf$_{0,0}$ | hg$_{0,0}$ | hh$_{0,0}$ | ha$_{1,0}$ |
| | B$_{0,1}$ | ab$_{0,1}$ | ac$_{0,1}$ | ad$_{0,1}$ | ae$_{0,1}$ | af$_{0,1}$ | ag$_{0,1}$ | ah$_{0,1}$ | B$_{1,1}$ |

FIG. 13

REDUCED RESOLUTION PIXEL INTERPOLATION

This application claims priority to U.S. Provisional Application No. 61/504,149, filed 1 Jul. 2011; U.S. Provisional Application No. 61/506,016, filed 8 Jul. 2011; U.S. Provisional Application No. 61/506,059, filed 9 Jul. 2011; U.S. Provisional Application No. 61/507,564, filed 13 Jul. 2011; and, U.S. Provisional Application No. 61/549,131, filed 19 Oct. 2011; the entire contents each of which are hereby incorporated by reference.

TECHNICAL FIELD

This disclosure relates to video coding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, digital cameras, digital recording devices, video gaming devices, video game consoles, cellular or satellite radio telephones, smart phones, and the like. Digital video devices implement video compression techniques, such as those described in standards defined by MPEG-2, MPEG-4, or ITU-T H.264/MPEG-4, Part 10, Advanced Video Coding (AVC), to transmit and receive digital video information more efficiently. Video compression techniques may perform spatial prediction and/or temporal prediction to reduce or remove redundancy inherent in video sequences.

Block based inter-coding is a very useful coding technique that relies on temporal prediction to reduce or remove temporal redundancy between video blocks of successive coded units of a video sequence. The coded units may comprise video frames, slices of video frames, groups of pictures, or another defined unit of encoded video blocks. For inter-coding, the video encoder performs motion estimation and motion compensation to track the movement of corresponding video blocks of two or more adjacent coded units. Motion estimation generates motion vectors, which indicate the displacement of video blocks relative to corresponding prediction video blocks in one or more reference frames or other coded units. Motion compensation uses the motion vectors to generate prediction video blocks from the one or more reference frames or other coded units. After motion compensation, residual video blocks are formed by subtracting prediction video blocks from the original video blocks being coded.

The video encoder may also apply transform, quantization and entropy coding processes to further reduce the bit rate associated with communication of residual blocks. Transform techniques may comprise discrete cosine transforms (DCTs) or conceptually similar processes. Alternatively, wavelet transforms, integer transforms, or other types of transforms may be used. In a DCT process, as an example, a set of pixel values are converted into transform coefficients, which may represent the energy of the pixel values in the frequency domain. Quantization is applied to the transform coefficients, and generally involves a process that reduces the number of bits associated with any given transform coefficient. Entropy coding comprises one or more processes that collectively compress a sequence of coding modes, motion information, coded block patterns, and quantized transform coefficients. Examples of entropy coding include but are not limited to content adaptive variable length coding (CAVLC) and context adaptive binary arithmetic coding (CABAC).

A coded video block may be represented by prediction information that can be used to create or identify a predictive block, and a residual block of data indicative of differences between the block being coded and the predictive block. The prediction information may comprise the one or more motion vectors that are used to identify the predictive block of data. Given the motion vectors, the decoder is able to reconstruct the predictive blocks that were used to code the residual. Thus, given a set of residual blocks and a set of motion vectors (and possibly some additional syntax), the decoder can reconstruct a video frame that was originally encoded. Inter-coding based on motion estimation and motion compensation can achieve very good compression because successive video frames or other types of coded units are often very similar. An encoded video sequence may comprise blocks of residual data, motion vectors, and possibly other types of syntax.

Interpolation techniques have been developed in order to improve the level of compression that can be achieved in inter-coding. For example, the predictive data generated during motion compensation, which is used to code a video block, may be interpolated from the pixels of video blocks of the video frame or other coded unit used in motion estimation. Interpolation is often performed to generate predictive half pixel (half-pel) values and predictive quarter pixel (quarter-pel) values. The half- and quarter-pel values are associated with sub-pixel locations. Fractional motion vectors may be used to identify video blocks at the sub-pixel resolution in order to capture fractional movement in a video sequence, and thereby provide predictive blocks that are more similar to the video blocks being coded than the integer video blocks.

SUMMARY

This disclosure describes filtering techniques applied by an encoder and a decoder during the prediction stage of a video encoding and/or decoding process. Pixel data is commonly represented as a series of pixel values (e.g., luminance values and/or chrominance values). These pixel values are often either 8-bit values or 10-bit values, although other bit depths may also be used. Interpolation filtering typically involves performing a series of multiplication and addition operations using pixel values. Due to these multiplication and addition operations, in some instances, interpolation filtering with 10-bit pixel values results in intermediate values that are 17 bits. 17-bit values, however, can be undesirable because registers and other computer components typically operate in units of 16 or 32 bits. Even though these intermediate values may be 17 bits, the range of values covered by these 17-bit values may still only be 16 bits. Accordingly, this disclosure describes techniques for applying an offset to intermediate pixel values to reduce the bit depth of the intermediate values. The intermediate values can then be stored with the reduced bit depth. When retrieved for future calculations, the offset may be added back to the intermediate values, such that the calculation is performed using higher precision values, even though lower precision values are stored. Accordingly, the techniques of this disclosure may, in some instances, improve the efficiency of a coding system by maintaining intermediate values that can be efficiently stored, while at the same time, minimizing the loss of precision associated with reducing the bit depth of the intermediate values.

In one example, a method includes obtaining a block of pixels, wherein the block of pixels includes integer pixel values corresponding to integer pixel positions within the block of pixels, applying a first filtering operation to a group of integer pixel values to generate a first intermediate pixel value, adding a first offset to the first intermediate pixel value to generate a second intermediate pixel value, wherein adding the first offset causes the second intermediate value to have a smaller bit depth than the first intermediate pixel value; storing the second intermediate pixel value; retrieving the second intermediate pixel value, adding a second offset to the retrieved second intermediate value, applying a second filtering operation to a group of intermediate pixel values comprising the retrieved second intermediate pixel value with the added second offset to compute a first pixel value for a sub-pixel location, and generating a prediction block based on at least the first pixel value for the sub-pixel location In another example, a video coding device includes a video coder configured to obtain a block of pixels, wherein the block of pixels includes integer pixel values corresponding to integer pixel positions within the block of pixels, apply a first filtering operation to a group of integer pixel values to generate a first intermediate pixel value, add a first offset to the first intermediate pixel value to generate a second intermediate pixel value, wherein adding the first offset causes the second intermediate value to have a smaller bit depth than the first intermediate pixel value, store the second intermediate pixel value; retrieve the second intermediate pixel value, add a second offset to the retrieved second intermediate value, apply a second filtering operation to a group of intermediate pixel values comprising the retrieved second intermediate pixel value with the added second offset to compute a first pixel value for a sub-pixel location, and generate a prediction block based on at least the first pixel value for the sub-pixel location.

In another example, an apparatus includes means for obtaining a block of pixels, wherein the block of pixels includes integer pixel values corresponding to integer pixel positions within the block of pixels, means for applying a first filtering operation to a group of integer pixel values to generate a first intermediate pixel value, means for adding a first offset to the first intermediate pixel value to generate a second intermediate pixel value, wherein applying the first offset causes the second intermediate value to have a smaller bit depth than the first intermediate pixel value, means for storing the second intermediate pixel value, means for retrieving the second intermediate pixel value, means for adding a second offset to the retrieved second intermediate value; means for applying a second filtering operation to a group of intermediate pixel values comprising the retrieved second intermediate pixel value with the added second offset to compute a first pixel value for a sub-pixel location, and means for generating a prediction block based on at least the first pixel value for the sub-pixel location.

In another example, a computer readable storage medium stores instructions that upon execution cause one or more processors to obtain a block of pixels, wherein the block of pixels includes integer pixel values corresponding to integer pixel positions within the block of pixels, apply a first filtering operation to a group of integer pixel values to generate a first intermediate pixel value, add a first offset to the first intermediate pixel value to generate a second intermediate pixel value, wherein applying the first offset causes the second intermediate value to have a smaller bit depth than the first intermediate pixel value, store the second intermediate pixel value, retrieve the second intermediate pixel value, add a second offset to the retrieved second intermediate value, apply a second filtering operation to a group of intermediate pixel values comprising the retrieved second intermediate pixel value with the added second offset to compute a first pixel value for a sub-pixel location, and generate a prediction block based on at least the first pixel value for the sub-pixel location.

The details of one or more aspects of the disclosure are set forth in the accompanying drawings and the description below. Other features, objects, and advantages of the techniques described in this disclosure will be apparent from the description and drawings, and from the claims.

BRIEF DESCRIPTION OF DRAWINGS

FIG. 3 is a conceptual diagram illustrating integer-pixel positions associated with prediction data, and sub-pixel positions associated with interpolated prediction data.

FIG. 6 is a conceptual diagram illustrating a horizontal 8 pixel filter support with coefficient symmetry, relative to a sub-pixel location.

FIG. 7 is a conceptual diagram illustrating a horizontal 8 pixel filter support without coefficient symmetry, relative to a sub-pixel location.

FIG. 8 is a conceptual diagram illustrating a vertical 8 pixel filter support with coefficient symmetry, relative to a sub-pixel location.

FIG. 9 is a conceptual diagram illustrating a vertical 8 pixel filter support without coefficient symmetry, relative to a sub-pixel location.

FIG. 12 is a conceptual diagram illustrating integer-pixel positions associated with prediction data, and sub-pixel positions associated with interpolated prediction data.

FIG. 13 is a conceptual diagram illustrating integer-pixel positions associated with prediction data, and sub-pixel positions associated with interpolated prediction data.

DETAILED DESCRIPTION

This disclosure describes filtering techniques applied by an encoder and a decoder during the prediction stage of a video encoding and/or decoding process. Pixel data is commonly represented as a series of pixel values (e.g., luminance values and/or chrominance values). These pixel values are often either 8-bit values or 10-bit values, although other bit depths may also be used. Interpolation filtering typically involves performing a series of multiplication and addition operations using pixel values. Due to these multiplication and addition operations, in some instances, interpolation filtering with 10-bit pixel values results in intermediate values that are 17 bits. 17-bit values, however, can be undesirable because registers and other computer components typically operate in units of 16 or 32 bits. Even though these intermediate values may be 17 bits, this disclosure describes techniques for keeping these 17-bit values within a range of values that is only 16 bits. This disclosure also describes techniques for applying an offset to intermediate pixel values to reduce the bit depth of the intermediate values. The intermediate values can then be stored with the reduced bitdepth. When retrieved for future calculations, the offset may be added back to the intermediate values, such that the calculation is performed using higher precision values, even though lower precision values are stored. Accordingly the techniques of this disclosure may, in some instances, improve the efficiency of a coding system by maintaining intermediate values that can be efficiently stored, while at the same time, minimizing the loss of precision associated with reducing the bit depth of the intermediate values.

Figure 1:
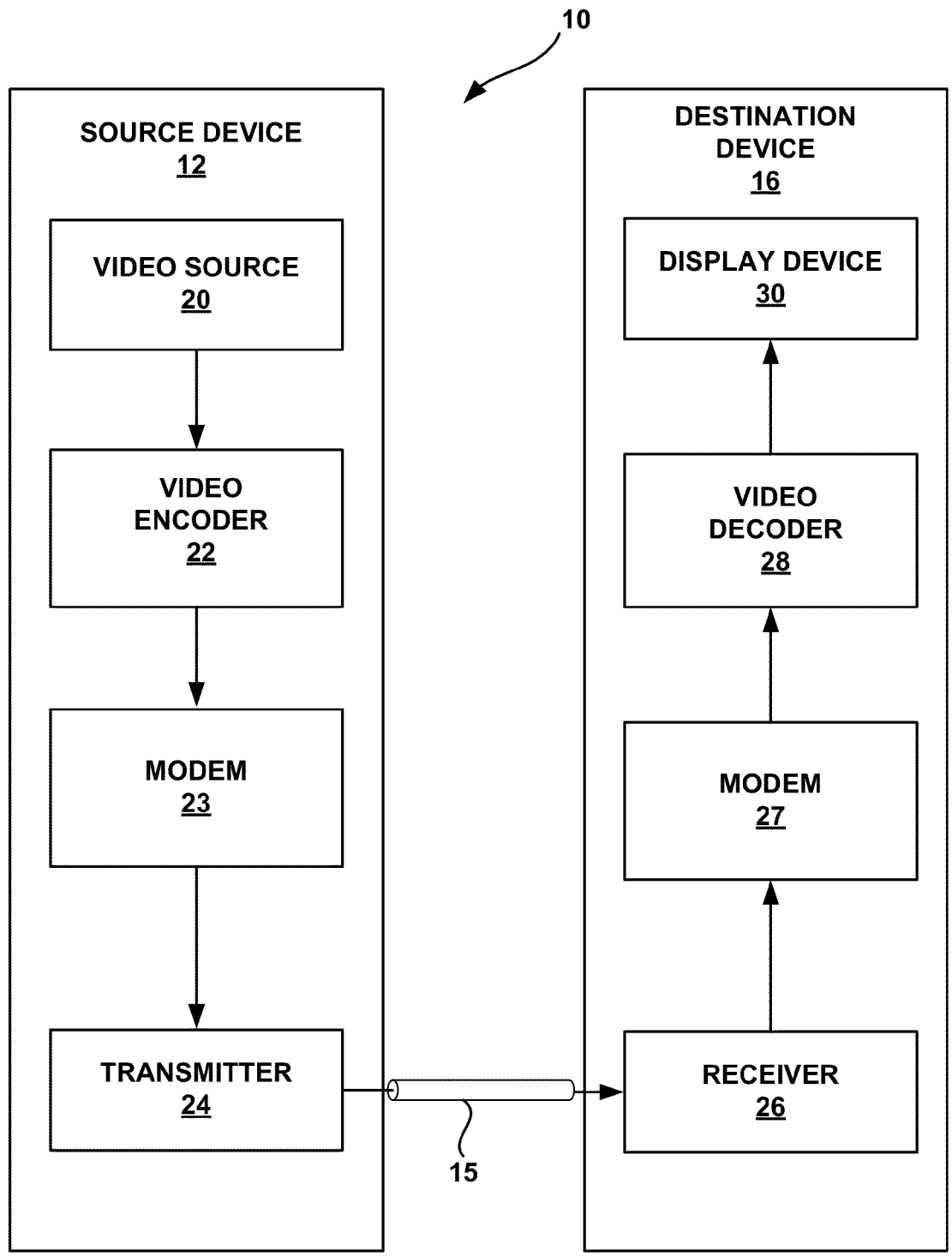
FIG. 1 is a block diagram illustrating one exemplary video encoding and decoding system that may implement techniques of this disclosure.

FIG. 1 is a block diagram illustrating one exemplary video encoding and decoding system 10 that may be used to implement aspects of this disclosure, which generally relate to techniques for processing intermediate values during a pixel interpolation process. As shown in FIG. 1, system 10 includes a source device 12 that transmits encoded video data to a destination device 16 via a communication channel 15. Source device 12 and destination device 16 may comprise any of a wide range of devices. In some instances, source device 12 and destination device 16 may comprise wireless communication devices, such as wireless handsets, so-called cellular or satellite radiotelephones, or any wireless devices that can communicate video information over a communication channel 15, in which case communication channel 15 is wireless. The techniques of disclosure, however, which concern filtering and the generation of predictive data during predictive coding, are not necessarily limited to wireless applications or settings. Thus, aspects of this disclosure may also be useful in a wide rage of other settings and devices, including devices that communicate via physical wires, optical fibers or other physical or wireless media. In addition, the encoding or decoding techniques may also be applied in a stand alone device that does not necessarily communicate with any other device.

In the example of FIG. 1, source device 12 may include a video source 20, video encoder 22, modulator/demodulator (modem) 23 and transmitter 24. Destination device 16 may include a receiver 26, modem 27, video decoder 28, and display device 30. In accordance with this disclosure, video encoder 22 of source device 12 may be configured to apply one or more of the techniques of this disclosure as part of a video encoding process. Similarly, video decoder 28 of destination device 16 may be configured to apply one or more of the techniques of this disclosure as part of a video decoding process.

Again, the illustrated system 10 of FIG. 1 is merely exemplary. The various techniques of this disclosure may be performed by any encoding device that supports block-based predictive encoding, or by any decoding device that supports block-based predictive decoding. Source device 12 and destination device 16 are merely examples of such coding devices in which source device 12 generates coded video data for transmission to destination device 16. In some cases, devices 12, 16 may operate in a substantially symmetrical manner such that, each of devices 12, 16 include video encoding and decoding components. Hence, system 10 may support one-way or two-way video transmission between video devices 12, 16, e.g., for video streaming, video playback, video broadcasting, or video telephony.

Video source 20 of source device 12 may include a video capture device, such as a video camera, a video archive containing previously captured video, or a video feed from a video content provider. As a further alternative, video source 20 may generate computer graphics-based data as the source video, or a combination of live video, archived video, and computer-generated video. In some cases, if video source 20 is a video camera, source device 12 and destination device 16 may form so-called camera phones or video phones. In each case, the captured, pre-captured or computer-generated video may be encoded by video encoder 22. The encoded video information may then be modulated by modem 23 according to a communication standard, e.g., such as code division multiple access (CDMA) or another communication standard, and transmitted to destination device 16 via transmitter 24 and communication channel 15. Modem 23 may include various mixers, filters, amplifiers or other components designed for signal modulation. Transmitter 24 may include circuits designed for transmitting data, including amplifiers, filters, and one or more antennas.

Receiver 26 of destination device 16 receives information over communication channel 15, and modem 27 demodulates the information. Like transmitter 24, receiver 26 may include circuits designed for receiving data, including amplifiers, filters, and one or more antennas. In some instances, transmitter 24 and/or receiver 26 may be incorporated within a single transceiver component that include both receive and transmit circuitry. Modem 27 may include various mixers, filters, amplifiers or other components designed for signal demodulation. In some instances, modems 23 and 27 may include components for performing both modulation and demodulation.

Again, the video encoding process performed by video encoder 22 may implement one or more of the techniques described herein during motion compensation. The video decoding process performed by video decoder 28 may also perform such techniques during its motion compensation stage of the decoding process. The term "coder" is used herein to refer to a specialized computer device or apparatus that performs video encoding or video decoding. The term "coder" generally refers to any video encoder, video decoder, or combined encoder/decoder (codec). The term "coding" refers to encoding or decoding. Display device 30 displays the decoded video data to a user, and may comprise any of a variety of display devices such as a cathode ray tube (CRT), a liquid crystal display (LCD), a plasma display, an organic light emitting diode (OLED) display, or another type of display device.

In the example of FIG. 1, communication channel 15 may comprise any wireless or wired communication medium, such as a radio frequency (RF) spectrum or one or more physical transmission lines, or any combination of wireless and wired media. Communication channel 15 may form part of a packet-based network, such as a local area network, a wide-area network, or a global network such as the Internet. Communication channel 15 generally represents any suitable communication medium, or collection of different communication media, for transmitting video data from source device 12 to destination device 16. Communication channel 15 may include routers, switches, base stations, or any other equipment that may be useful to facilitate communication from source device 12 to destination device 16.

Video encoder 22 and video decoder 28 may operate according to one or more video compression standards, such as the ITU-T H.264 standard, alternatively described as MPEG-4, Part 10, Advanced Video Coding (AVC), or may operating according to a next-generation video compression standard. The techniques of this disclosure, however, are not limited to any particular video coding standard. Although not shown in FIG. 1, in some aspects, video encoder 22 and video decoder 28 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

Video encoder 22 and video decoder 28 each may be implemented as one or more microprocessors, digital signal processors (DSPs), application specific integrated circuits (ASICs), field programmable gate arrays (FPGAs), discrete logic, software, hardware, firmware or any combinations thereof. Each of video encoder 22 and video decoder 28 may be included in one or more encoders or decoders, either of which may be integrated as part of a combined codec that provides encoding and decoding capabilities in a respective mobile device, subscriber device, broadcast device, server, or the like.

A video sequence typically includes a series of video frames. Video encoder 22 operates on video blocks within individual video frames in order to encode the video data. The video blocks may have fixed or varying sizes, and may differ in size according to a specified coding standard. Each video frame includes a series of slices. Each slice may include a series of macroblocks, which may be arranged into sub-blocks. As an example, the ITU-T H.264 standard supports intra prediction in various block sizes, such as 16 by 16, 8 by 8, or 4 by 4 for luma components, and 8×8 for chroma components, as well as inter prediction in various block sizes, such as 16 by 16, 16 by 8, 8 by 16, 8 by 8, 8 by 4, 4 by 8 and 4 by 4 for luma components and corresponding scaled sizes for chroma components. Video blocks may comprise blocks of pixel data, or blocks of transformation coefficients, e.g., following a transformation process such as discrete cosine transform (DCT) or a conceptually similar transformation process.

Smaller video blocks can provide better resolution, and may be used for locations of a video frame that include high levels of detail. In general, macroblocks and the various sub-blocks may be considered to be video blocks. In addition, a slice may be considered to be a series of video blocks, such as macroblocks and/or sub-blocks. Each slice may be an independently decodable unit of a video frame. Alternatively, frames themselves may be decodable units, or other portions of a frame may be defined as decodable units. The term "coded unit" refers to any independently decodable unit of a video frame such as an entire frame, a slice of a frame, or another independently decodable unit defined according to the coding techniques used.

To encode the video blocks, video encoder 22 performs intra- or inter-prediction to generate a prediction block. Video encoder 22 subtracts the prediction blocks from the original video blocks to be encoded to generate residual blocks. Thus, the residual blocks are indicative of differences between the blocks being coded and the prediction blocks. Video encoder 22 may perform a transform on the residual blocks to generate blocks of transform coefficients. Following intra- or inter-based predictive coding and transformation techniques, video encoder 22 performs quantization. Quantization generally refers to a process in which coefficients are quantized to possibly reduce the amount of data used to represent the coefficients. Following quantization, entropy coding may be performed according to an entropy coding methodology, such as context adaptive variable length coding (CAVLC) or context adaptive binary arithmetic coding (CABAC). More details of each step of the encoding process performed by video encoder 22 will be described in more detail below in FIG. 2.

In destination device 16, video decoder 28 receives the encoded video data. Video decoder 28 entropy decodes the received video data according to an entropy coding methodology, such as CAVLC or CABAC, to obtain the quantized coefficients. Video decoder 28 applies inverse quantization (de-quantization) and inverse transform functions to reconstruct the residual block in the pixel domain. Video decoder 28 also generates a prediction block based on control information or syntax information (e.g., coding mode, motion vectors, syntax that defines filter coefficients and the like) included in the encoded video data. Video decoder 28 sums the prediction block with the reconstructed residual block to produce a reconstructed video block for display. More details of each step of the decoding process performed by video decoder 28 will be described in more detail below in reference to FIG. 10.

According to aspects of this disclosure, video encoder 22 and video decoder 28 may use the one or more interpolation filtering techniques during motion compensation. In particular, in accordance with one aspect of this disclosure, video encoder 22 and/or video decoder 28 may perform interpolation filtering on 10-bit values and apply an offset to the 17-bit values such that the intermediate values are reduced to 16 bits with minimal loss of precision. Applying the offset may, for example, include adding a rounding factor and performing a right shift operation on the intermediate values.

Figure 2:
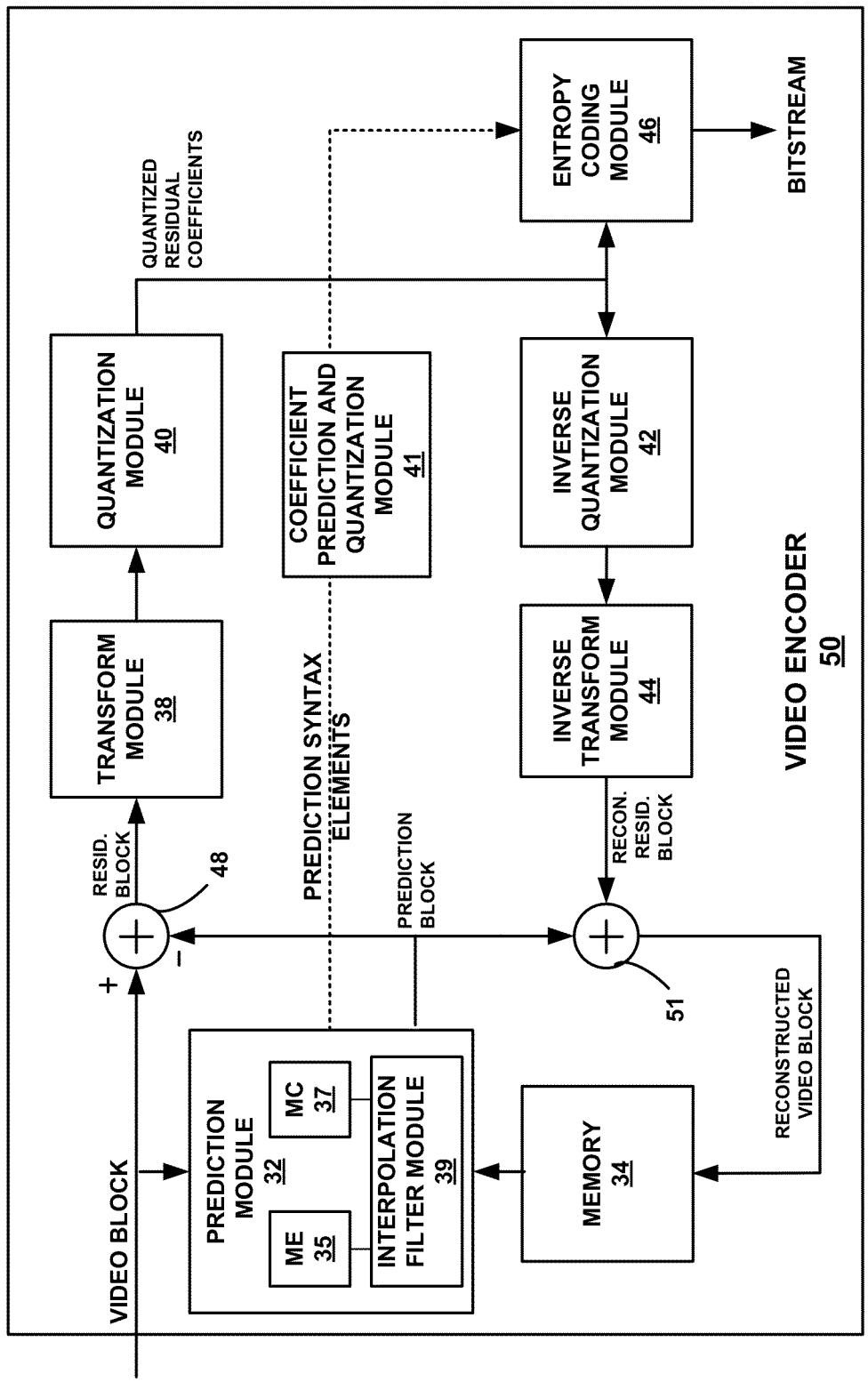
FIG. 2 is a block diagram illustrating an example of a video encoder that may perform filtering techniques consistent with this disclosure.

FIG. 2 is a block diagram illustrating an example of a video encoder 50 that may perform filtering techniques consistent with this disclosure. Video encoder 50 is one example of a specialized video computer device or apparatus referred to herein as a "coder." Video encoder 50 may correspond to video encoder 22 of device 20, or a video encoder of a different device. Video encoder 50 may perform intra- and inter-coding of blocks within video frames, although intra-coding components are not shown in FIG. 2 for ease of illustration. Intra-coding relies on spatial prediction to reduce or remove spatial redundancy in video within a given video frame. Inter-coding relies on temporal prediction to reduce or remove temporal redundancy in video within adjacent frames of a video sequence. Intra-mode (I-mode) may refer to the spatial based compression mode, and Inter-modes such as a prediction (P-mode) or a bi-directional (B-mode) may refer to the temporal based compression modes. The techniques of this disclosure apply during inter-coding, and therefore, intra-coding units such as spatial prediction unit are not illustrated in FIG. 2 for simplicity and ease of illustration.

As shown in FIG. 2, video encoder 50 receives a video block within a video frame to be encoded. In the example of FIG. 2, video encoder 50 includes a prediction module 32, memory 34, an adder 48, a transform module 38, a quantization module 40, and an entropy coding module 46. For video block reconstruction, video encoder 50 also includes an inverse quantization module 42, an inverse transform module 44, and an adder 51. A deblocking filter (not shown) may also be included to filter block boundaries to remove blockiness artifacts from reconstructed video. If desired, the deblocking filter would typically filter the output of adder 51.

Prediction module 32 may include a motion estimation (ME) module 35, and a motion compensation (MC) module 37. Filter module 39 may be included in prediction module 32 and may be invoked by one or both of ME module 35 and MC module 37 to perform interpolation or interpolation-like filtering as part of motion estimation and/or motion compensation, according to this disclosure. Filter module 39 may actually represent a plurality of different filters to facilitate numerous different types of interpolation and interpolation-type filtering as described herein. Thus, prediction module 32 may include a plurality of interpolation or interpolation-like filters. Additionally, filter module 39 may include a plurality of filter indexes for a plurality of sub-pixel locations. Filter indexes associate a bit pattern and a sub-pixel location with a particular interpolation filter. During the encoding process, video encoder 50 receives a video block to be coded (labeled "VIDEO BLOCK" in FIG. 2), and prediction module 32 performs inter-prediction coding to generate a prediction block (labeled "PRED. BLOCK" in FIG. 2). Specifically, ME module 35 may perform motion estimation to identify the prediction block in memory 34, and MC module 37 may perform motion compensation to generate the prediction block.

Motion estimation is typically considered the process of generating motion vectors, which estimate motion for video blocks. A motion vector, for example, may indicate the displacement of a prediction block within a prediction or reference frame (or other coded unit, e.g., slice) relative to the block to be coded within the current frame (or other coded unit). The reference frame (or portion of the frame) may be temporally located prior to or after the video frame (or portion of the video frame) to which the current video block belongs. Motion compensation is typically considered the process of fetching or generating the prediction block from memory 34, or possibly interpolating or otherwise generating filtered predictive data based on the motion vector determined by motion estimation.

ME module 35 selects the appropriate motion vector for the video block to be coded by comparing the video block to video blocks of one or more reference frames (e.g., a previous and/or subsequent frame). ME module 35 may perform motion estimation with fractional pixel precision, sometimes referred to as fractional pixel, fractional pel, or sub-pixel motion estimation. As such, the terms fractional pixel, fractional pel, and sub-pixel motion estimation may be used interchangeably. In fractional pixel motion estimation, ME module 35 may select a motion vector that indicates displacement to a location other than an integer pixel location. In this manner, fractional pixel motion estimation allows prediction module 32 to track motion with higher precision than integer-pixel (or full-pixel) locations, thus generate a more accurate prediction block. Fractional pixel motion estimation may have half-pixel precision, quarter-pixel precision, eighth-pixel precision or any finer precision. ME module 35 may invoke filter(s) 39 for any necessary interpolations during the motion estimation process.

To perform fractional pixel motion compensation, MC module 37 may perform interpolation (sometimes referred to as interpolation filtering) in order to generate data at sub-pixel resolution (referred to herein as sub-pixel or fractional pixel values). MC module 37 may invoke filter(s) 39 for this interpolation. Prediction module 32 may perform the interpolation (or interpolation-like filtering of integer pixels) using the techniques described herein.

Once the motion vector for the video block to be coded is selected by ME module 35, MC module 37 generates the prediction video block associated with that motion vector. MC module 37 may fetch the prediction block from memory 34 based on the motion vector determined by MC module 35. In the case of a motion vector with fractional pixel precision, MC module 37 filters data from memory 34 to interpolate such data to sub-pixel resolution, e.g., invoking filter(s) 39 for this process. In some cases, the interpolation filtering technique or mode that was used to generate the sub-pixel prediction data may be indicated as one or more interpolation syntax elements to entropy coding module 46 for inclusion in the coded bitstream.

Once prediction module 32 has generated the prediction block, video encoder 50 forms a residual video block (labeled "RESID. BLOCK" in FIG. 2) by subtracting the prediction block from the original video block being coded. Adder 48 represents the component or components that perform this subtraction operation. Transform module 38 applies a transform, such as a discrete cosine transform (DCT) or a conceptually similar transform, to the residual block, producing a video block comprising residual transform block coefficients. Transform module 38, for example, may perform other transforms, such as those defined by the H.264 standard, which are conceptually similar to DCT. Wavelet transforms, integer transforms, sub-band transforms or other types of transforms could also be used. In any case, transform module 38 applies the transform to the residual block, producing a block of residual transform coefficients. The transform may convert the residual information from a pixel domain to a frequency domain.

Quantization module 40 quantizes the residual transform coefficients to further reduce bit rate. The quantization process may reduce the bit depth associated with some or all of the coefficients. Following quantization, entropy coding module 46 entropy codes the quantized transform coefficients. For example, entropy coding module 46 may perform CAVLC, CABAC, or another entropy coding methodology.

Entropy coding module 46 may also code one or more prediction syntax elements obtained from prediction module 32 or other component of video encoder 50. The one or more prediction syntax elements may include a coding mode, one or more motion vectors, an interpolation technique that was use to generate the sub-pixel data, a set or subset of filter coefficients, or other information associated with the generation of the prediction block. Coefficient prediction and quantization module 41 may predictively encode and quantize the prediction syntax, such as filter coefficients, according to some aspects of this disclosure. Following the entropy coding by entropy coding module 46, the encoded video and syntax elements may be transmitted to another device or archived for later transmission or retrieval.

Inverse quantization module 42 and inverse transform module 44 apply inverse quantization and inverse transformation, respectively, to reconstruct the residual block in the pixel domain, e.g., for later use as a reference block. The reconstructed residual block (labeled "RECON. RESID. BLOCK" in FIG. 2) may represent a reconstructed version of the residual block provided to transform module 38. The reconstructed residual block may differ from the residual block generated by summer 48 due to loss of detail caused by the quantization and inverse quantization operations. Summer 51 adds the reconstructed residual block to the motion compensated prediction block produced by prediction module 32 to produce a reconstructed video block for storage in memory 34. The reconstructed video block may be used by prediction module 32 as a reference block that may be used to subsequently code a block in a subsequent video frame or subsequent coded unit.

As described above, prediction module 32 may perform motion estimation with fractional pixel (or sub-pixel) precision. When prediction module 32 uses fractional pixel motion estimation, prediction module 32 may generate data at sub-pixel resolution (e.g., sub-pixel or fractional pixel values) using interpolation operations described in this disclosure. In other words, the interpolation operations are used to compute values at positions between the integer pixel positions. Sub-pixel positions located half the distance between integer-pixel positions may be referred to as half-pixel (half-pel) positions, sub-pixel positions located half the distance between an integer-pixel position and a half-pixel position may be referred to as quarter-pixel (quarter-pel) positions, sub-pixel positions located half the distance between an integer-pixel position (or half-pixel position) and a quarter-pixel position are referred to as eighth-pixel (eighth-pel) positions, and the like.

Figure 3:
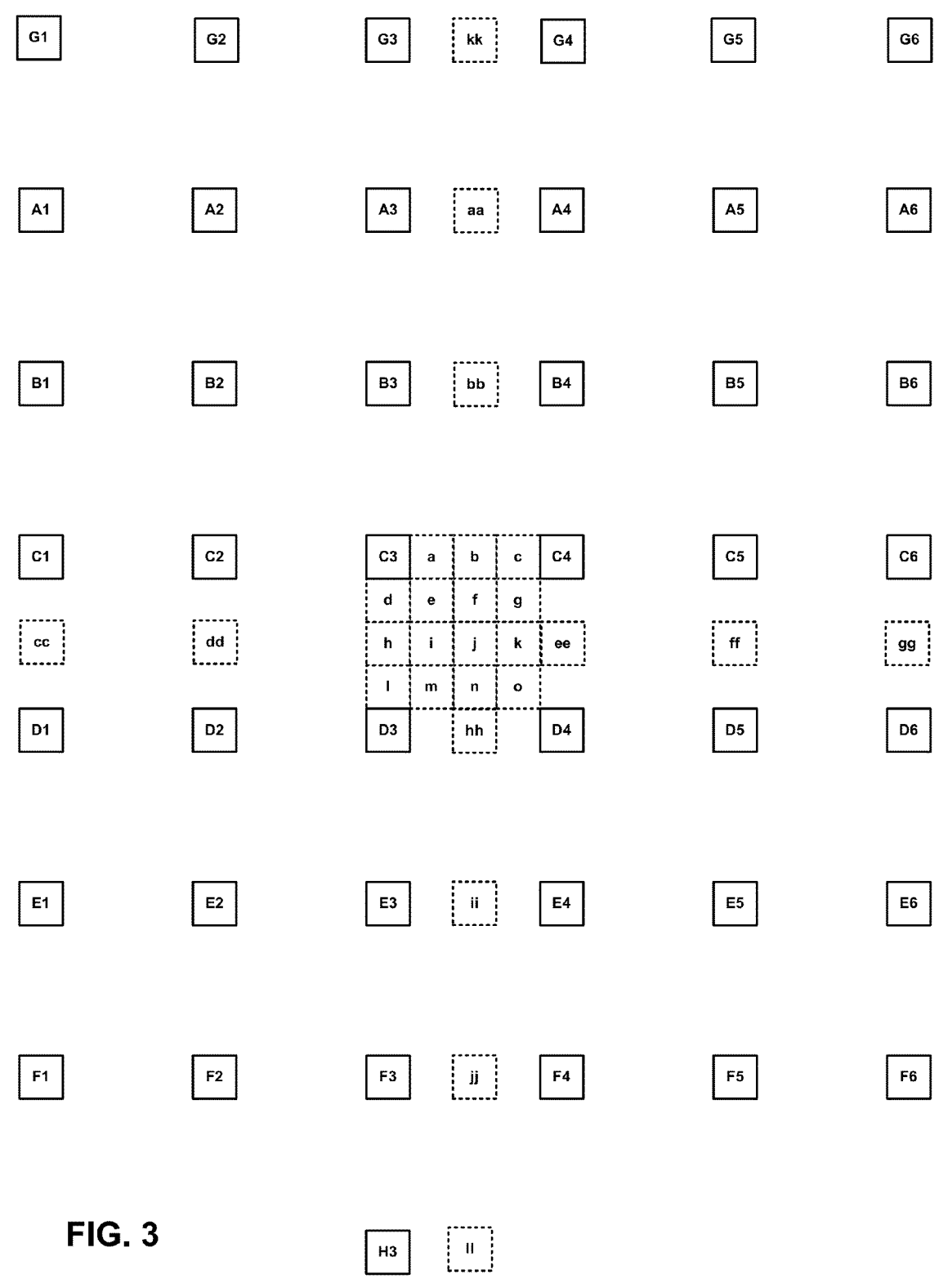

FIG. 3 is a conceptual diagram illustrating integer pixel (or full pixel) positions associated with prediction data, and sub-pixel (or fractional-pixel) positions associated with interpolated prediction data. In the conceptual illustration of FIG. 3, the different boxes represent pixel and sub-pixel locations or positions within a frame or a block of a frame. Capitalized letters (in the boxes with solid lines) represent integer-pixel locations, while small letters (in the boxes with dotted lines) represent the sub-pixel locations. In particular, pixel locations A1-A6, B1-B6, C1-C6, D1-D6, E1-E6 and F1-F6 represent a 6-by-6 array of integer pixel locations within a frame, slice, or other coded unit. Additional integer-pixel locations G3 and H3 are also shown in FIG. 3 to be used with examples described later in this disclosure. Sub-pixel locations "a" through "o" represent fifteen sub-pixel locations associated with integer pixel C3, e.g., between integer pixel locations C3, C4, D3 and D4. Similar sub-pixel locations may exist for every integer pixel location. The sub-pixel locations "a" through "o" represent every half-pel and quarter-pel pixel location associated with integer pixel C3.

Integer-pixel locations may be associated with a physical sensor element, such as a photodiode when the video data was originally generated. The photodiode may measure an intensity of a light source at the location of the sensor and associate a pixel intensity value with the integer-pixel location. Again, each integer-pixel location may have an associated set of fifteen sub-pixel locations (or possibly more). The number of sub-pixel locations associated with integer-pixel locations may be dependent upon the desired precision. In the example illustrated in FIG. 3, the desired precision is quarter-pixel precision, in which case, each of the integer pixel locations corresponds with fifteen different sub-pixel positions. More or fewer sub-pixel positions may be associated with each integer-pixel location based on the desired precision. For half-pixel precision, for example, each integer-pixel location may correspond with three sub-pixel positions. As another example, each of the integer-pixel locations may correspond with sixty-three sub-pixel positions for eighth-pixel precision. Each pixel location may define one or more pixel values, e.g., one or more luminance and chrominance values.

Y may represent luminance, and Cb and Cr may represent two different values of chrominance of a three-dimensional YCbCr color space. Each pixel location may actually define three pixel values for a three-dimensional color space. The techniques of this disclosure, however, may refer to prediction with respect to one dimension for purposes of simplicity. To the extent that techniques are described with respect to pixel values in one dimension, similar techniques may be extended to the other dimensions. In some cases, chrominance values are sub-sampled prior to prediction, but prediction typically occurs in the luminance space without any sub-sampling because human vision is more sensitive to pixel intensity than to pixel color.

Figure 4:
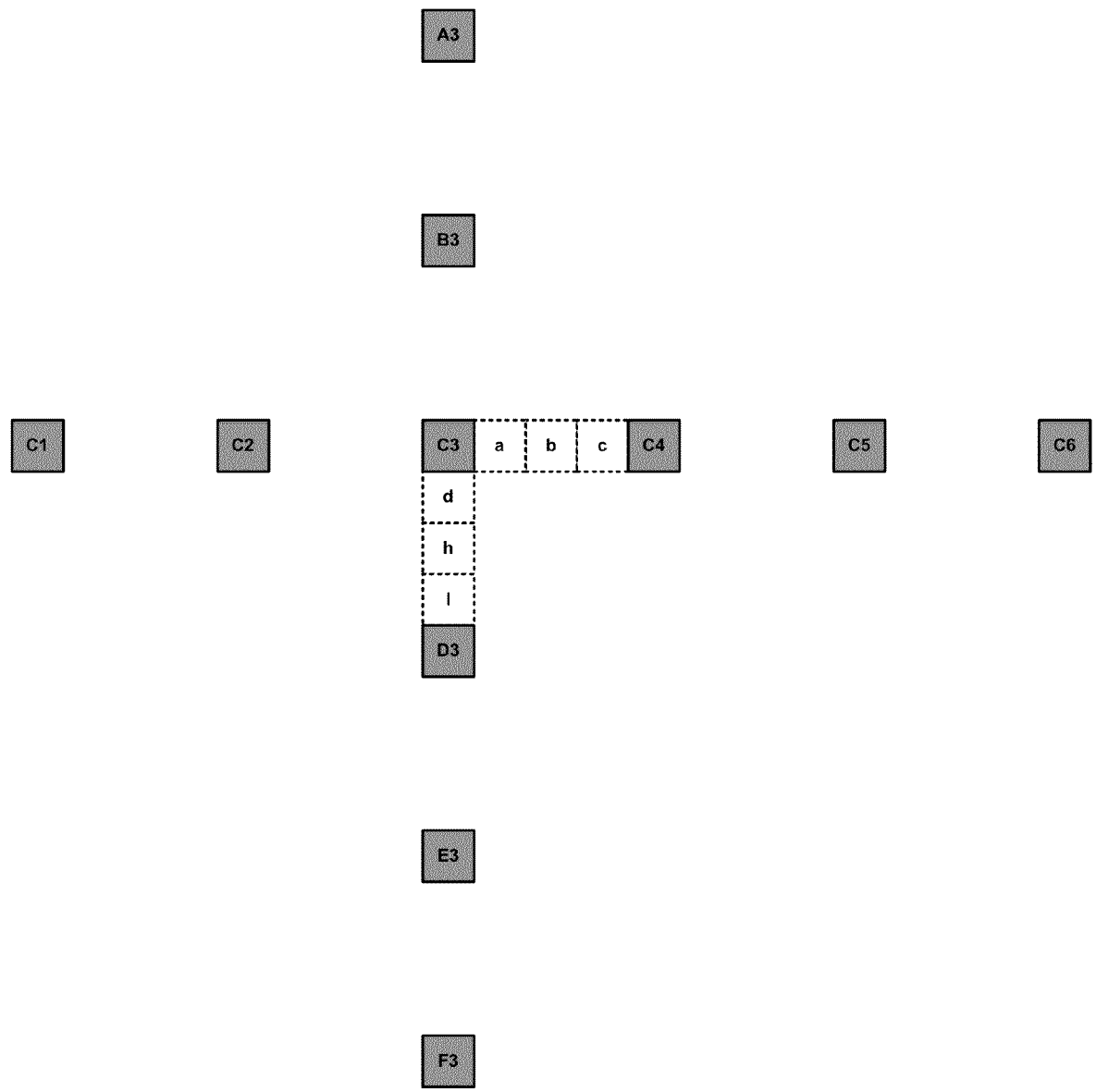
FIG. 4 is a conceptual diagram illustrating integer-pixel positions associated with prediction data, and vertical sub-pixel positions and horizontal sub-pixel positions associated with interpolated prediction data.

In the example of FIG. 3, sub-pixel locations, also referred to as sub-pixel positions, associated with integer pixel "C3" are illustrated for quarter-pixel precision. The fifteen sub-pixel positions associated with pixel C3 are labeled as "a," "b," "c," "d," "e," "f," "g," "h," "i," "j," "k," "l," "m," "n," and "o." Most of the other fractional locations associated with other integer-pixel locations are not shown for simplicity. Sub-pixel locations "b," "h" and "j" may be referred to as half-pixel locations and sub-pixel locations "a," "c," "d," "e," "f," "g," "i," "k," "l," "m," and "o" may be referred to as quarter-pixel locations. Furthermore, in this disclosure, sub-pixel positions oriented along the same horizontal axis as integer pixels can be referred to as horizontal sub-pixels. Sub-pixels "a," "b,", and "c" are examples of horizontal sub-pixels. Sub-pixels oriented on the same vertical axis as an integer pixel can be referred to as vertical sub-pixels. Sub-pixels "d," "h," and "l" are examples of vertical sub-pixels. Aspects of this disclosure include determining pixel values for horizontal sub-pixels and vertical sub-pixels using a single linear interpolation filter, and thus this disclosure may refer to horizontal sub-pixels and vertical sub-pixels collectively as 1 L sub-pixels. FIG. 4 is a conceptual diagram showing the 1 L sub-pixels (a, b, c, d, h, l) relative to a group of integer pixels (C1-C6, A3, B3, C3, D3, E3, and F3).

Figure 5:
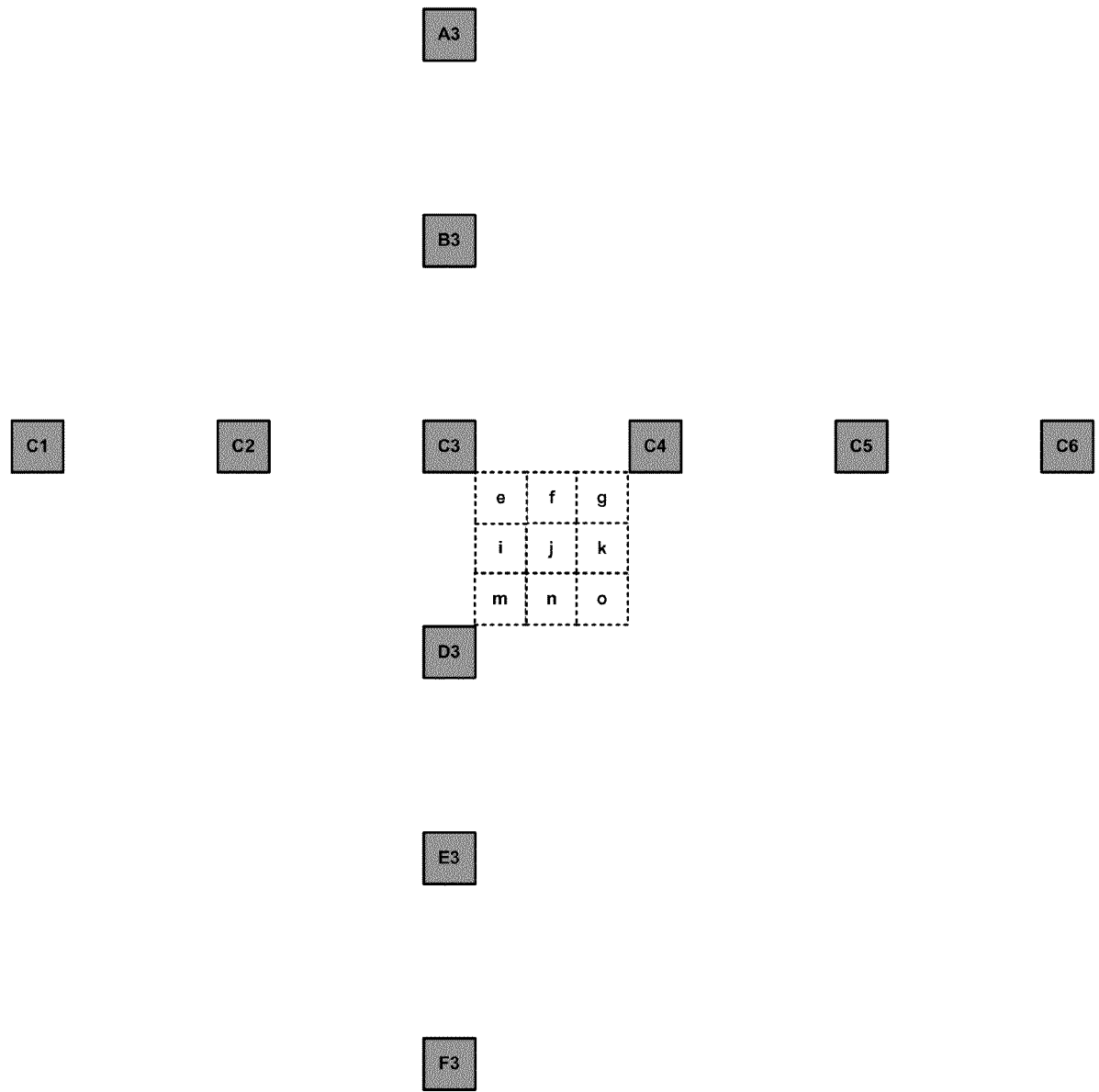
FIG. 5 is a conceptual diagram illustrating integer-pixel positions associated with prediction data, and non-vertical and non-horizontal sub-pixel 2 L sub-pixel positions associated with interpolated prediction data.

Aspects of this disclosure include determining pixel values for non-vertical, non-horizontal sub-pixels, such as sub-pixels "e," "f," "g," "i," "j," "k," "m," "n," and "o," using two linear interpolation filters, one applied in the vertical direction and one applied in the horizontal direction. Accordingly, this disclosure may refer to non-vertical, non-horizontal sub-pixels, such as sub-pixels "e," "f," "g," "i," "j," "k," "m," "n," and "o," as 2 L sub-pixels. FIG. 5 is a conceptual diagram showing the 2 L sub-pixels (e, f, g, i, j, k, m, n, o) relative to a group of integer pixels (C1-C6, A3, B3, C3, D3, E3, and F3).

FIG. 6 is a conceptual diagram illustrating eight horizontal linear pixel support positions C0-C7 relative to a sub-pixel position "b," with shading that shows coefficient symmetry. In this case, coefficient symmetry means that only four filter coefficients are needed for C0, C1, C2 and C3 in order to define the entire set of coefficients for filter support positions C0-C7. C0 is symmetric with C7, C1 is symmetric with C6, C2 is symmetry with C5, and C3 is symmetric with C4. Thus, only four coefficients need to be communicated as part of an encoded video bitstream, or stored by filter module 39, in order to define the set of eight coefficients needed to interpolate sub-pixel position "b." The remaining coefficients can be generated at the decoder based on the communicated coefficients. In particular, the decoder can be programmed to know that symmetry applies, and the symmetry can define how to generate any remaining coefficients based on the communicated coefficients.

FIG. 7 is a conceptual diagram illustrating eight horizontal linear pixel support positions relative to a sub-pixel, with shading that shows a lack of any coefficient symmetry. Thus, all eight coefficients are needed in order to define the set of coefficients for filter support with respect to sub-pixel position "a." However, pixel symmetry means that these same coefficients with respect to sub-pixel position "a" can also be used to derive the filter support for sub-pixel position "c." If the eight coefficients for filter support with respect to sub-position "a" are viewed as a one-dimensional array, then the eight coefficients for sub-pixel "c" can be found by flipping the array, such that the coefficient for C7 when determining a value for sub-pixel "a" can be the coefficient for C0 when determining a value for sub-pixel "c," the coefficient for C6 can be the coefficient for C1, and so on. Thus, if using adaptive interpolation filtering (AIF) for example, where the filter coefficients are computed at video encoder 22, only eight coefficients need to be communicated in the bit stream to video decoder 28 in order to define two different sets of eight coefficients needed to interpolate sub-pixel positions "a" and "c."

FIG. 8 is a conceptual diagram illustrating eight vertical linear pixel support positions G3, A3, B3, C3, D3, E3, F3, and H3 relative to a sub-pixel "h," with shading that shows coefficient symmetry. In this case, coefficient symmetry means that only four filter coefficients are needed for G3, A3, B3 and C3 in order to define the entire set of coefficients for filter support positions G3, A3, B3, C3, D3, E3, F3, and H3. G3 is symmetric with H3, A3 is symmetric with F3, B3 is symmetry with E3, and C3 is symmetric with D3. Due to the symmetry, the coefficient associated with G3 can also be used with H3, the coefficient associated with A3 can also used with F3, and so on. Thus, if using AIF, for example, only four coefficients need to be communicated as part of an encoded video bitstream in order to define the set of eight coefficients needed to interpolate sub-pixel position "h."

FIG. 9 is a conceptual diagram illustrating eight vertical linear pixel support positions relative to a sub-pixel, with shading that shows a lack of any coefficient symmetry. Thus, all eight coefficients are needed in order to define the set of coefficients for filter support with respect to sub-pixel position "d." As noted above with respect to FIG. 7, however, pixel symmetry means that these same coefficients with respect to sub-pixel position "d" can also be used to derive the filter support for sub-pixel position "l." Thus, if using AIF, for example, only eight coefficients need to be communicated in the bit stream to video decoder 28 in order to define two different sets of eight coefficients needed to interpolate sub-pixel positions "d" and "l."

Prediction module 32 of video encoder 40 may determine pixel values for sub-pixel locations "a" through "o" using interpolation filtering by filter module 39. For half-pixel positions "b" and "h," each filter coefficient, also called a tap, may correspond to an integer pixel position in the horizontal and vertical direction, respectively. In particular, for half-pixel position "b," the taps of the 8-tap filter correspond to C0, C1, C2, C3, C4, C5, C6, and C7. Sub-pixel positions C0 and C7 are not shown in FIG. 3 but can be seen, for example, in FIGS. 6 and 7. Likewise, for half-pixel position "h," the taps of the 8-tap filter correspond to G3, A3, B3, C3, D3, E3, F3, and H3. For example, pixel values for sub-pixel positions "b" and "h" may be computed using equations (1) and (2):

$$b=((-3*C0+12*C1-39*C2+158*C3+158*C4-39*C5+12*C6-3*C7)+\text{offset}) \quad (1)$$

$$h=((-3*G3+12*A3-39*B3+158*C3+158*D3-39*E3+12*F3-3*H3)+\text{offset}) \quad (2)$$

As with position "b," for quarter-pixel positions "a" and "c," the taps of the 8-tap filter may correspond to C0, C1, C2, C3, C4, C5, C6, and C7, but unlike for position "b," the filter coefficients might be non-symmetric and different than for position "b." For example, pixel values for sub-pixel positions "a" and "c" may be computed using equations (3) and (4):

$$a=((-3*C0+12*C1-37*C2+229*C3+71*C4-21*C5+6*C6-C7)+\text{offset}) \quad (3)$$

$$c=((-C0+6*C1-21*C2+71*C3+229*C4-37*C5+12*C6-3*C7)+\text{offset}) \quad (4)$$

As with position "h," for quarter-pixel positions "d" and "l," the taps of the 8-tap filter may correspond to G3, A3, B3, C3, D3, E3, F3, and H3, but unlike for position "h," the filter coefficients might be non-symmetric and different than for position "h." For example, pixel values for sub-pixel positions "d" and "l" may be computed using equations (5) and (6):

$$d=((-3*G3+12*A3-37*B3+229*C3+71*D3-21*E3+6*F3-H3)+\text{offset}) \quad (5)$$

$$l=((-3*G3+6*A3-21*B3+71*C3+229*D3-37*E3+12*F3-3*H3)+\text{offset}) \quad (6)$$

Although the example coefficients given for equations (1)-(6) above generally use the same coefficients for both horizontal sub-pixels and vertical sub-pixels, it is not required that the coefficients for horizontal and vertical sub-pixels be the same. For example, equations (1) and (2), (3) and (5), and (4) and (6), respectively have the same coefficients in the examples above, but in some implementations, each may have different coefficients.

Prediction module 32 of video encoder 40 may also determine pixel values for 2 L sub-pixel locations "e," "f," "g," "i," "j," "k," "m," "n," and "o," using interpolation filtering by filter module 39. For the 2 L sub-pixel positions, a horizontal filtering is followed by a vertical filtering, or vice versa. The first filtering operation determines intermediate values, and the second filtering operation utilizes the intermediate values to determine a pixel value for the sub-pixel location. For example, to determine a value for "j," 8-tap horizontal filters can be used to determine the intermediate values for "aa," "bb," "b," "hh," "ii," and "jj," using the following equations:

$$aa=((-1*A0+4*A1-11*A2+40*A3+40*A4-11*A5+4*A6-1*A7)+\text{offset}) \quad (7)$$

$$bb=((-1*B0+4*B1-11*B2+40*B3+40*B4-11*B5+4*B6-1*B7)+\text{offset}) \quad (8)$$

$$b=((-1*C0+4*C1-11*C2+40*C3+40*C4-11*C5+4*C6-1*C7)+\text{offset}) \quad (9)$$

$$hh=((-1*D0+4*D1-11*D2+40*D3+40*D4-11*D5+4*D6-1*D7)+\text{offset}) \quad (10)$$

$$ii=((-1*E0+4*E1-11*E2+40*E3+40*E4-11*E5+4*E6-1*E7)+\text{offset}) \quad (11)$$

$$jj=((-1*F0+4*F1-11*F2+40*F3+40*F4-11*F5+4*F6-1*F7)+\text{offset}) \quad (12)$$

$$kk=((-1*G0+4*G1-11*G2+40*G3+40*G4-11*G5+4*G6-1*G7)+\text{offset}) \quad (13)$$

$$ll=((-1*H0+4*H1-11*H2+40*H3+40*H4-11*H5+4*H6-1*H7)+\text{offset}) \quad (14)$$

Due to the multiplication and addition operations performed in equations (7)-(14), the intermediate values for "aa," "bb," "b," "hh," "ii," "jj," "kk," and "ll" may in some instances be 17-bit values. For example, if "aa," "bb," "b," "hh," "ii," "jj," kk," and "ll" are 10-bit values ranging from 0 to 1023, then using the example coefficients above, equations (7)-(14) could result in a value as high as 90024 in a situation where the pixel values multiplied by positive filter coefficients are 1023 and pixel values multiplied by negative filter coefficients are zero. The 17-bit values produced by equations (7)-(14) may, however, only cover a 16-bit range of values. Accordingly, techniques of this disclosure include adding an offset to the 17-bit values to reduce the intermediate values to 16-bit values. The offset may be applied using a right shift operation. Additionally, the offset may include a rounding factor that causes the values of equations (7)-(14) to be rounded up when reduced to 16-bits.

By applying an 8-tap vertical filter to the 16-bit intermediate values determined above, the value for "j" can be determined using the following equation:

$$j=((3*kk+8*aa-40*bb+160*c3+160*hh-40*ii+8*jj+3*ll)+\text{offset}) \quad (15)$$

Due to the multiplication and addition operations performed in equation (15), the value for j may be a 21-bit value. Accordingly, to reduce the 21-bit value to a 10-bit value, techniques of this disclosure include performing a right shift operation on the 21-bit value to reduce the intermediate values to 10-bit values. The offset value of equation (15) may include a rounding term that causes values of equation 15 to be rounded up when reduced to 10-bits.

The above example has described a technique where horizontal filtering is applied first followed by vertical filtering. In some implementations, however, vertical filtering may be applied first followed by horizontal filtering. For example, 8-tap vertical filters can be used to find intermediate values for "cc," "dd," "h," "ee," "ff," and "gg," plus two additional values not shown in FIG. 3, and a 8-tap horizontal can be applied to those intermediate values to determine a pixel value for "j."

Similar to the procedure described above for sub-pixel "j,", pixel values for sub-pixel locations "e," "f," "g," "i," "k," "m," "n," and "o" can be determined by first performing a horizontal filtering operation to determine intermediate values and then applying a vertical filter to those intermediate values, or by first performing a vertical filtering operation to determine intermediate values and then applying a horizontal filter to the intermediate values determined by the vertical filtering. While both the horizontal and vertical filters used as examples above for sub-pixel "j" use symmetrical coefficients, one or both of the horizontal or vertical filters used to determine pixel values for the other 2D sub-pixel values may not be symmetrical. For example, in one exemplary implementation, both the horizontal and vertical filters for sub-pixel locations "e," "g," "m," and "o" might use non-symmetrical coefficients. Sub-pixel locations "f" and "n" may use a horizontal filter with symmetrical coefficients and a vertical filter with non-symmetrical coefficients, and sub-pixel locations "i" and "k" may use a horizontal filter with non-symmetrical coefficients and a vertical filter with symmetrical filter coefficients.

The actual filters applied by filter module 39 to generate interpolated data at the sub-pixel locations may be subject to a wide variety of implementations. As one example, prediction module 32 may utilize AIF, where the filter coefficients are computed by video encoder 22 and transmitted in the bit stream to video decoder 28. As another example, prediction module 32 may utilize switched filtering, where multiple filters are known by both video encoder 22 and video decoder 28, and the particular filter to be used is signaled from video encoder 22 to video decoder 28 in the bit stream. In an example of switched filtering, video encoder 22 and video decoder 28 might store four unique filters for each sub-pixel position, and the particular filter to be used for a sub-pixel position can be signaled from video encoder 22 to video decoder 28 using two bits.

Prediction module 32 may use separable interpolation filters in the horizontal direction and in the vertical direction. For the 1 L sub-pixel positions, prediction module 32 (e.g., MC module 37 of prediction module 32) applies only horizontal directional filters or only vertical directional filters depending on the sub-pixel location. In one example, the horizontal and vertical directional filters comprise 8-position (or 8-tap) filters. Prediction module 32 applies horizontal directional filters for sub-pixel positions "a," "b," and "c" with integer-pixel positions C0, C1, C2, C3, C4, C5, C6, and C7 (C0 and C7 not shown at FIG. 3) as filter support and applies vertical directional filters for sub-pixel positions "d," "h," and "l" with integer-pixel positions G3, A3, B3, C3, D3, E3, F3, and H3 (see FIG. 3) as filter support. For the remaining sub-pixel positions, i.e., the 2 L sub-pixel positions, prediction module 32 applies horizontal filtering first, followed by vertical filtering or vertical filtering first, followed by horizontal filtering. The horizontal and vertical filters used for the 2 L sub-pixel positions might each be a 6-tap filter.

Figure 10:
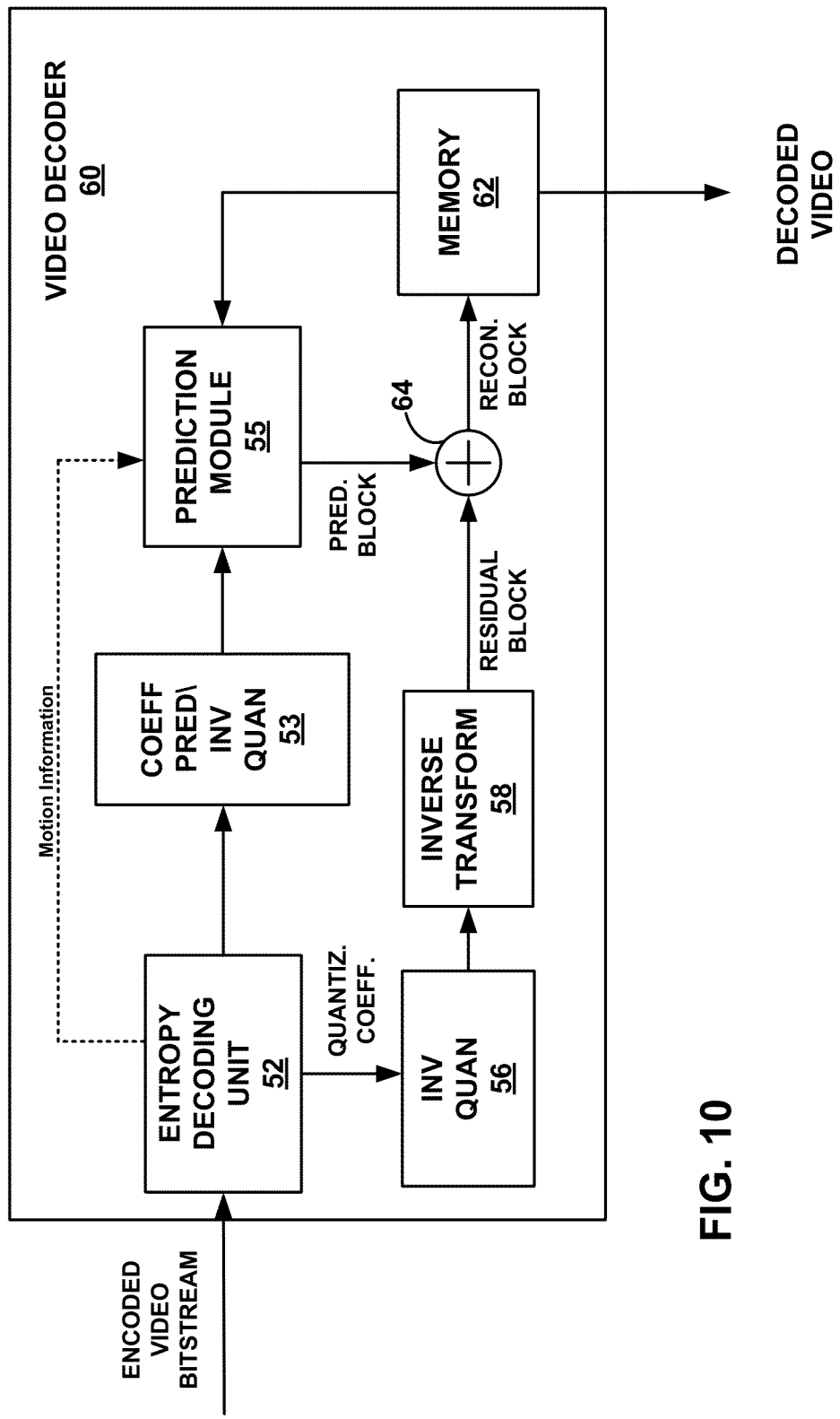
FIG. 10 is a block diagram illustrating an example of a video decoder, which may decode a video sequence that is encoded in the manner described herein.

FIG. 10 is a block diagram illustrating an example of a video decoder, which may decode a video sequence that is encoded in the manner described herein. Video decoder 60 is one example of a specialized video computer device or apparatus referred to herein as a "coder." Video decoder 60 includes an entropy decoding module 52 that entropy decodes the received bitstream to generate quantized coefficients and the prediction syntax elements. The prediction syntax elements may include a coding mode, one or more motion vectors, information identifying an interpolation technique use to generate the sub-pixel data, coefficients for use in interpolation filtering, and/or other information associated with the generation of the prediction block.

The prediction syntax elements, e.g., the coefficients, are forwarded to prediction module 55. If prediction is used to code the coefficients relative to coefficients of a fixed filter, or relative to one another, coefficient prediction and inverse quantization module 53 can decode the syntax elements to define the actual coefficients. Also, if quantization is applied to any of the prediction syntax, coefficient prediction and inverse quantization module 53 can also remove such quantization. Filter coefficients, for example, may be predictively coded and quantized according to this disclosure, and in this case, coefficient prediction and inverse quantization module 53 can be used by video decoder 60 to predictively decode and de-quantize such coefficients.

Prediction module 5 may generate prediction data based on the prediction syntax elements and one or more previously decoded blocks that are stored in memory 62, in much the same way as described in detail above with respect to prediction module 32 of video encoder 50. In particular, prediction module 55 may perform one or more of the interpolation filtering techniques of this disclosure during motion compensation to generate a prediction block with a particular precision, such as quarter-pixel precision. As such, one or more of the techniques of this disclosure may be used by video decoder 60 in generating a prediction block. Prediction module 55 may include a motion compensation module that comprises filters used for interpolation and interpolation-like filtering techniques of this disclosure. The motion compensation component is not shown in FIG. 10 for simplicity and ease of illustration.

Inverse quantization module 56 inverse quantizes, i.e., de-quantizes, the quantized coefficients. The inverse quantization process may be a process defined for H.264 decoding. Inverse transform module 58 applies an inverse transform, e.g., an inverse DCT or conceptually similar inverse transform process, to the transform coefficients in order to produce residual blocks in the pixel domain. Summer 64 sums the residual block with the corresponding prediction block generated by prediction module 55 to form a reconstructed version of the original block encoded by video encoder 50. If desired, a deblocking filter may also be applied to filter the decoded blocks in order to remove blockiness artifacts. The decoded video blocks are then stored in reference frame store 62, which provides reference blocks for subsequent motion compensation and also produces decoded video to drive display device (such as device 28 of FIG. 1).

Figure 11:
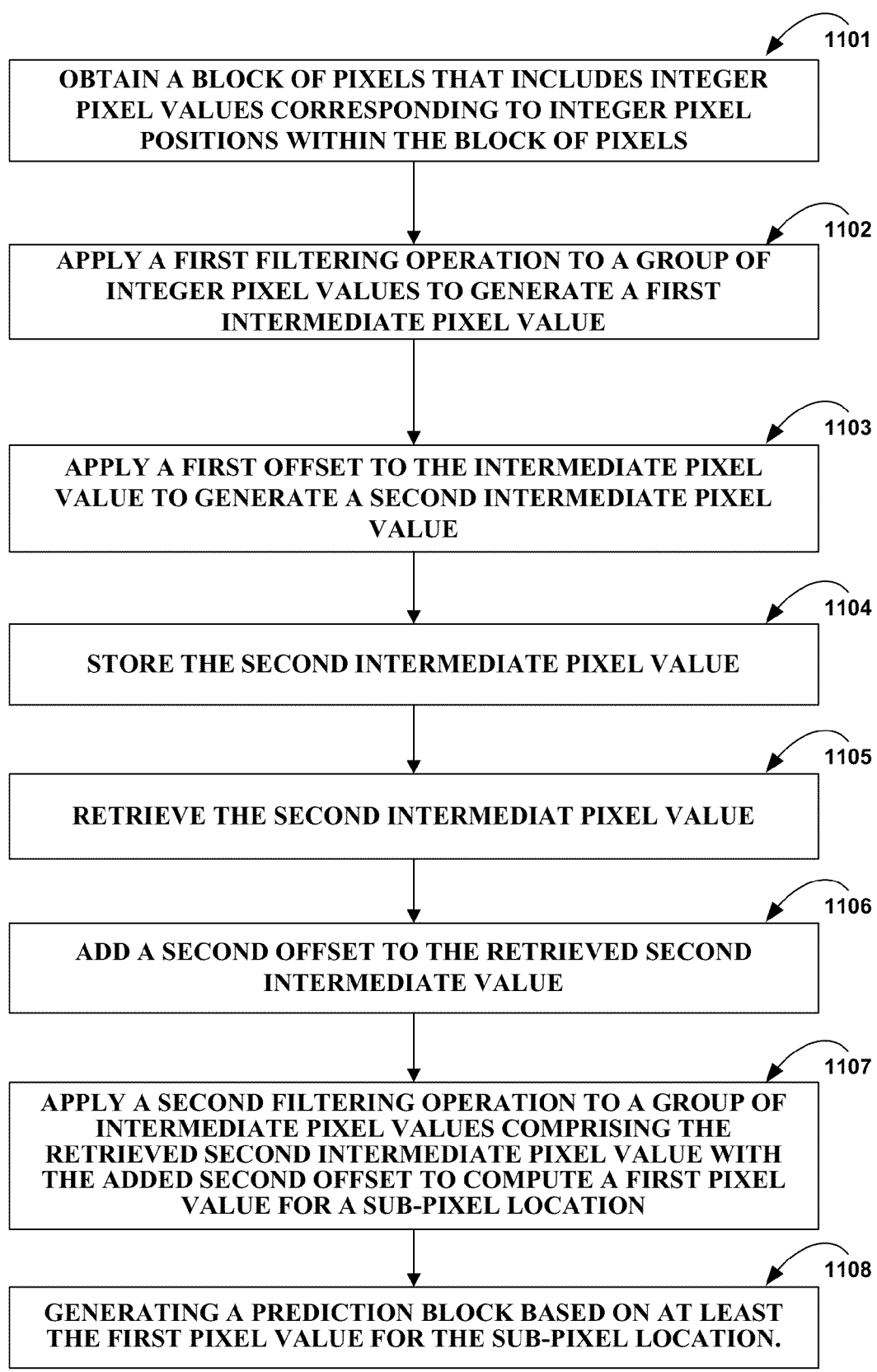
FIG. 11 is a flow diagram illustrating techniques of this disclosure.

FIG. 11 is a flow diagram illustrating techniques of this disclosure. The techniques of FIG. 11 may, for example, be performed by prediction module 32 of video encoder 50 or prediction module 55 of video decoder 60. The prediction module obtains a block of pixels that includes integer pixel values corresponding to integer pixel positions within the block of pixels (1101). The prediction module applies a first filtering operation to a group of integer pixel values to generate a first intermediate pixel value (1102). The group of integer pixel values may, for example, be 10-bit values. The prediction module applies a first offset to the intermediate pixel value to generate a second intermediate pixel value (1103). The first intermediate pixel value may, for example, be a 17-bit value, and the first offset may reduce the first intermediate pixel value to a 16-bit second intermediate pixel value. The prediction module stores the second intermediate pixel value (1104). As the second intermediate pixel value is 16 bits, the second intermediate pixel value may, for example, be efficiently stored in a 16-bit register. The prediction module may retrieve the second intermediate pixel value (1105). The prediction module may add a second offset to the retrieved second intermediate value. The prediction module may apply a second filtering operation to the retrieved second intermediate pixel value with the added second offset value to compute a first pixel value for a sub-pixel location (1107). The prediction module may generate a prediction block based on at least the first pixel value for the sub-pixel location (1108).

Figure 12:
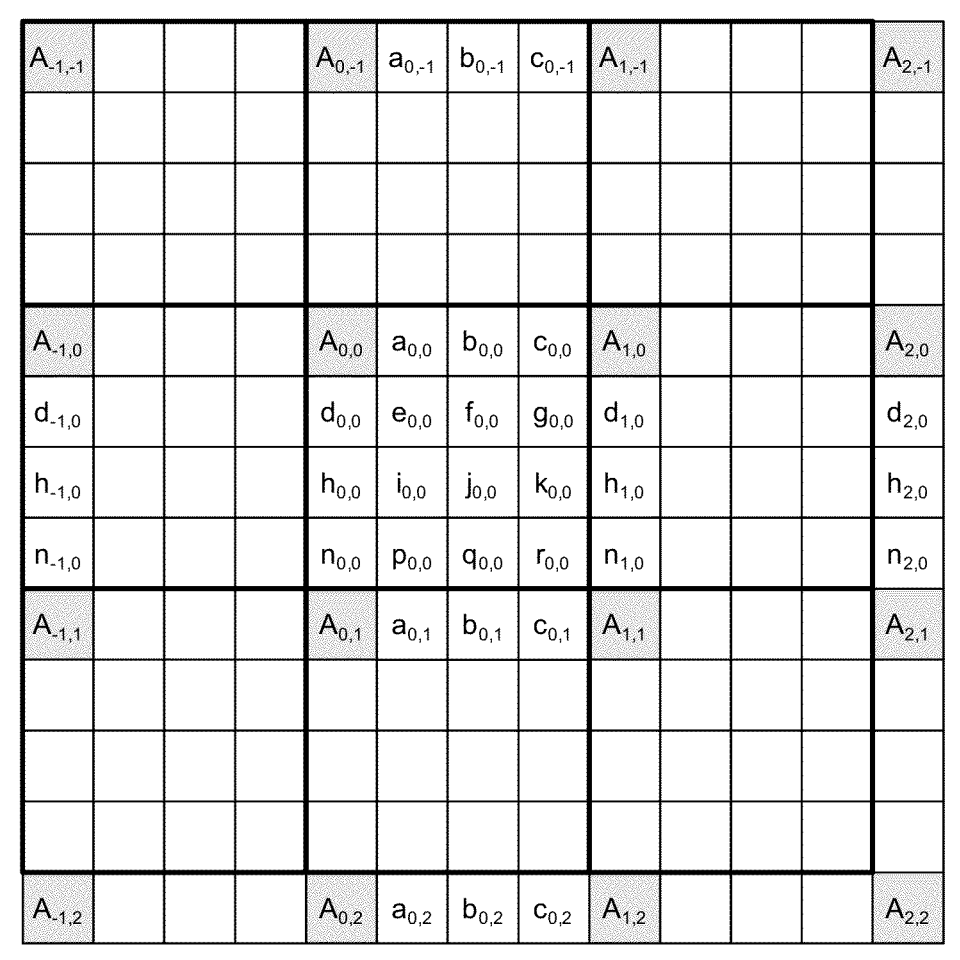

FIG. 12 and FIG. 13 are conceptual diagrams illustrating integer-pixel positions associated with prediction data and sub-pixel positions associated with interpolated prediction data. FIG. 12 and FIG. 13 illustrate examples of the techniques described in this disclosure. These techniques may, for example, be performed by video encoder 50, video decoder 60, or other types of video coders. In FIG. 12, the positions labeled with upper-case letters $A_{i,j}$ within shaded blocks represent luma samples at full-sample locations inside the given two-dimensional array $refPicLX_L$ of luma samples. In FIG. 12, integer samples are shown as shaded blocks with upper-case letters, and fractional sample positions are shown as un-shaded blocks with lower-case letters for quarter sample luma interpolation.

These samples may be used for generating the predicted luma sample value $predSampleLX_L[x_L, y_L]$. The locations $(xA_{i,j}, yA_{i,j})$ for each of the corresponding luma samples $A_{i,j}$ inside the given array $refPicLX_L$ of luma samples may be derived as follows:

$$xA_{i,j} = \text{Clip3}(0, \text{PicWidthInSamples}_L - 1, xInt_L + i) \quad (16)$$

$$yA_{i,j} = \text{Clip3}(0, \text{PicHeightInSamples}_L - 1, yInt_L + j) \quad (17)$$

where $(xInt_L, yInt_L)$ is a luma location in full-sample units.

Variables shift1, shift2, shift3, offset1 and offset2 may be derived as follows:

The variable shift1 may be set equal to $BitDepth_Y - 8$. The variable shift2 may be set equal to $BitDepth_Y - 2$, and the variable shift3 may be equal to $14 - BitDepth_Y$. $BitDepth_Y$ may be set equal to $8 + bit\_depth\_luma\_minus8$, where bit_depth_luma_minus8+8 specifies the bit depth of the samples of the luma array.

If the variable shift1 is equal to 0, the variable offset1 is set equal to 0. Otherwise, the variable offset1 may be set equal to $1 << (shift1 - 1)$.

The variable offset2 may be set equal to $1 << (shift2 - 1)$.

Given the luma samples $A_{i,j}$ at full-sample locations $(xA_{i,j}, yA_{i,j})$, the luma samples '$a_{0,0}$' to '$r_{0,0}$' at fractional sample positions may be derived by the following rules. The samples labeled $a_{0,0}$, $b_{0,0}$, $c_{0,0}$, $d_{0,0}$, $h_{0,0}$, and $n_{0,0}$ may be derived by applying the 8-tap filter to the nearest integer position samples and clipping the filtered value:

$$a_{0,0} = (-A_{-3,0} + 4*A_{-2,0} - 10*A_{-1,0} + 57*A_{0,0} + 19*A_{1,0} - 7*A_{2,0} + 3*A_{3,0} - A_{4,0} + \text{offset1}) >> \text{shift1} \quad (18)$$

$$b_{0,0} = (-A_{-3,0} + 4*A_{-2,0} - 11*A_{-1,0} + 40*A_{0,0} + 40*A_{1,0} - 11*A_{2,0} + 4*A_{3,0} - A_{4,0} + \text{offset1}) >> \text{shift1} \quad (19)$$

$$c_{0,0} = (-A_{-3,0} + 3*A_{-2,0} - 7*A_{-1,0} + 19*A_{0,0} + 57*A_{1,0} - 10*A_{2,0} + 4*A_{3,0} - A_{4,0} + \text{offset1}) >> \text{shift1} \quad (20)$$

$$d_{0,0} = (-A_{0,-3} + 4*A_{0,-2} - 10*A_{0,-1} + 57*A_{0,0} + 19*A_{0,1} - 7*A_{0,2} + 3*A_{0,3} - A_{0,4} + \text{offset1}) >> \text{shift1} \quad (21)$$

$$h_{0,0} = (-A_{0,-3} + 4*A_{0,-2} - 11*A_{0,-1} + 40*A_{0,0} + 40*A_{0,1} - 11*A_{0,2} + 4*A_{0,3} - A_{0,4} + \text{offset1}) >> \text{shift1} \quad (22)$$

$$n_{0,0} = (-A_{0,-3} + 3*A_{0,-2} - 7*A_{0,-1} + 19*A_{0,0} + 57*A_{0,1} - 10*A_{0,2} + 4*A_{0,3} - A_{0,4} + \text{offset1}) >> \text{shift1} \quad (23)$$

The samples labeled $e_{0,0}$, $f_{0,0}$, $g_{0,0}$, $i_{0,0}$, $j_{0,0}$, $k_{0,0}$, $p_{0,0}$, $q_{0,0}$, and $r_{0,0}$ may be derived by first calculating intermediate values denoted as $d1_{i,0}$, $h1_{i,0}$ and $n1_{i,0}$ where $i = -3 \ldots 4$ by applying the 8-tap filter to the nearest integer position samples in vertical direction:

$$d1_{i,0} = -A_{i,-3} + 4*A_{i,-2} - 10*A_{i,-1} + 57*A_{i,0} + 19*A_{i,1} - 7*A_{i,2} + 3*A_{i,3} - A_{i,4} \quad (24)$$

$$h1_{i,0} = -A_{i,-3} + 4*A_{i,-2} - 11*A_{i,-1} + 40*A_{i,0} + 40*A_{i,1} - 11*A_{i,2} + 4*A_{i,3} - A_{i,4} \quad (25)$$

$$n1_{i,0} = -A_{i,-3} + 3*A_{i,-2} - 7*A_{i,-1} + 19*A_{i,0} + 57*A_{i,1} - 10*A_{i,2} + 4*A_{i,3} - A_{i,4} \quad (26)$$

The final prediction values $e_{0,0}$, $f_{0,0}$, $g_{0,0}$, $i_{0,0}$, $j_{0,0}$, $k_{0,0}$, $p_{0,0}$, $q_{0,0}$ and $r_{0,0}$ may be derived by applying the 8-tap filter to the intermediate values $d1_{i,0}$, $h1_{i,0}$ and $n1_{i,0}$ where $i = -3 \ldots 4$ in horizontal direction:

$$e_{0,0} = (-d1_{-3,0} + 4*d1_{-2,0} - 10*d1_{-1,0} + 57*d1_{0,0} + 19*d1_{1,0} - 7*d1_{2,0} + 3*d1_{3,0} - d1_{4,0} + \text{offset2}) >> \text{shift2} \quad (27)$$

$$f_{0,0} = (-d1_{-3,0} + 4*d1_{-2,0} - 11*d1_{-1,0} + 40*d1_{0,0} + 40*d1_{1,0} - 11*d1_{2,0} + 4*d1_{3,0} - d1_{4,0} + \text{offset2}) >> \text{shift2} \quad (28)$$

$$g_{0,0} = (-d1_{-3,0} + 3*d1_{-2,0} - 7*d1_{-1,0} + 19*d1_{0,0} + 57*d1_{1,0} - 10*d1_{2,0} + 4*d1_{3,0} - d1_{4,0} + \text{offset2}) >> \text{shift2} \quad (29)$$

$$i_{0,0} = (-h1_{-3,0} + 4*h1_{-2,0} - 10*h1_{-1,0} + 57*h1_{0,0} + 19*h1_{1,0} - 7*h1_{2,0} + 3*h1_{3,0} - h1_{4,0} + \text{offset2}) >> \text{shift2} \quad (30)$$

$$j_{0,0} = (-h1_{-3,0} + 4*h1_{-2,0} - 11*h1_{-1,0} + 40*h1_{0,0} + 40*h1_{1,0} - 11*h1_{2,0} + 4*h1_{3,0} - h1_{4,0} + \text{offset2}) >> \text{shift2} \quad (31)$$

$$k_{0,0} = (-h1_{-3,0} + 3*h1_{-2,0} - 7*h1_{-1,0} + 19*h1_{0,0} + 57*h1_{1,0} - 10*h1_{2,0} + 4*h1_{3,0} - h1_{4,0} + \text{offset2}) >> \text{shift2} \quad (32)$$

$$p_{0,0} = (-n1_{-3,0} + 4*n1_{-2,0} - 10*n1_{-1,0} + 57*n1_{0,0} + 19*n1_{1,0} - 7*n1_{2,0} + 3*n1_{3,0} - n1_{4,0} + \text{offset2}) >> \text{shift2} \quad (33)$$

$$q_{0,0} = (-n1_{-3,0} + 4*n1_{-2,0} - 11*n1_{-1,0} + 40*n1_{0,0} + 40*n1_{1,0} - 11*n1_{2,0} + 4*n1_{3,0} - n1_{4,0} + \text{offset2}) >> \text{shift2} \quad (34)$$

$$r_{0,0} = (-n1_{-3,0} + 3*n1_{-2,0} - 7*n1_{-1,0} + 19*n1_{0,0} + 57*n1_{1,0} - 10*n1_{2,0} + 4*n1_{3,0} - n1_{4,0} + \text{offset2}) >> \text{shift2} \quad (35)$$

The positions labeled with lower-case letters within un-shaded blocks represent luma samples at quarter-pel sample fractional locations. The luma location offset in fractional-sample units $(xFrac_L, yFrac_L)$ specifies which of the generated luma samples at full-sample and fractional-sample locations is assigned to the predicted luma sample value $predSampleLX_L[x_L, y_L]$. The value of $predSampleLX_L[x_L, y_L]$ may be the output.

The techniques of this disclosure may also be applied to a chroma sample interpolation process. Example inputs to such a process are:

a chroma location in full-sample units $(xInt_C, yInt_C)$,
a chroma location in fractional-sample units $(xFrac_C, yFrac_C)$,
the chroma reference sample array $refPicLX_C$.

An output of this process can be a predicted chroma sample value $predSampleLX_C[x_C, y_C]$.

FIG. 13 shows integer samples (shaded blocks with uppercase letters) and fractional sample positions (un-shaded blocks with lower-case letters) for eighth sample chroma interpolation. In FIG. 13, the positions labeled with uppercase letters $B_{i,j}$ within shaded blocks represent chroma samples at full-sample locations inside the given two-dimensional array refPicLX$_C$ of chroma samples. These samples may be used for generating the predicted chroma sample value predSampleLX$_C$[x$_C$, y$_C$]. The locations (xB$_{i,j}$, yB$_{i,j}$) for each of the corresponding chroma samples $B_{i,j}$ inside the given array refPicLX$_C$ of chroma samples are derived as follows:

$$xB_{i,j}=\text{Clip3}(0,\text{PicWidthInSamples}_C-1,xInt_C+i) \tag{36}$$

$$yB_{i,j}=\text{Clip3}(0,\text{PicHeightInSamples}_C-1,yInt_C+j) \tag{37}$$

Variables shift1, shift2, shift3, offset1 and offset2 are derived as follows.

The variable shift1 is set equal to BitDepth$_C$−8, the variable shift2 is set equal to BitDepth$_C$−2, and the variable shift3 is set equal to 14−BitDepth$_C$.

If the variable shift1 is equal to 0, the variable offset1 is set equal to 0, otherwise, the variable offset1 is set equal to 1<<(shift1−1).

The variable offset2 is set equal to 1<<(shift2−1).

Given the chroma samples $B_{i,j}$ at full-sample locations (xB$_{i,j}$, yB$_{i,j}$), the chroma samples 'ab$_{0,0}$' to 'hh$_{0,0}$' at fractional sample positions are derived by the following rules.

The samples labeled ab$_{0,0}$, ac$_{0,0}$, ad$_{0,0}$, ae$_{0,0}$, af$_{0,0}$, ag$_{0,0}$, and ah$_{0,0}$ may be derived by applying the 4-tap filter to the nearest integer position samples and clipping the filtered value:

$$ab_{0,0}=\text{Clip3}(0,(1<<14)-1,(-3*B_{-1,0}+60*B_{0,0}+8*B_{1,0}-B_{2,0}+\text{offset1})>>\text{shift1}) \tag{38}$$

$$ac_{0,0}=\text{Clip3}(0,(1<<14)-1,(-4*B_{-1,0}+54*B_{0,0}+16*B_{1,0}-2*B_{2,0}+\text{offset1})>>\text{shift1}) \tag{39}$$

$$ad_{0,0}=\text{Clip3}(0,(1<<14)-1,(-5*B_{-1,0}+46*B_{0,0}+27*B_{1,0}-4*B_{2,0}+\text{offset1})>>\text{shift1}) \tag{40}$$

$$ae_{0,0}=\text{Clip3}(0,(1<<14)-1,(-4*B_{-1,0}+36*B_{0,0}+36*B_{1,0}-4*B_{2,0}+\text{offset1})>>\text{shift1}) \tag{41}$$

$$af_{0,0}=\text{Clip3}(0,(1<<14)-1,(-4*B_{-1,0}+27*B_{0,0}+46*B_{1,0}-5*B_{2,0}+\text{offset1})>>\text{shift1}) \tag{42}$$

$$ag_{0,0}=\text{Clip3}(0,(1<<14)-1,(-2*B_{-1,0}+16*B_{0,0}+54*B_{1,0}-4*B_{2,0}+\text{offset1})>>\text{shift1}) \tag{43}$$

$$ah_{0,0}=\text{Clip3}(0,(1<<14)-1,(-B_{-1,0}+8*B_{0,0}+60*B_{1,0}-3*B_{2,0}+\text{offset1})>>\text{shift1}) \tag{44}$$

The samples labeled ba$_{0,0}$, ca$_{0,0}$, da$_{0,0}$, ea$_{0,0}$, fa$_{0,0}$, ga$_{0,0}$, and ha$_{0,0}$ may be derived by applying the 4-tap filter to the nearest integer position samples and clipping the filtered value:

$$ba_{0,0}=\text{Clip3}(0,(1<<14)-1,(-3*B_{0,-1}+60*B_{0,0}+8*B_{0,1}-B_{0,2}+\text{offset1})>>\text{shift1}) \tag{45}$$

$$ca_{0,0}=\text{Clip3}(0,(1<<14)-1,(-4*B_{0,-1}+54*B_{0,0}+16*B_{0,1}-2*B_{0,2}+\text{offset1})>>\text{shift1}) \tag{46}$$

$$da_{0,0}=\text{Clip3}(0,(1<<14)-1,(-5*B_{0,-1}+46*B_{0,0}+27*B_{0,1}-4*B_{0,2}+\text{offset1})>>\text{shift1}) \tag{47}$$

$$ea_{0,0}=\text{Clip3}(0,(1<<14)-1,(-4*B_{0,-1}+36*B_{0,0}+36*B_{0,1}-4*B_{0,2}+\text{offset1})>>\text{shift1}) \tag{48}$$

$$fa_{0,0}=\text{Clip3}(0,(1<<14)-1,(-4*B_{0,-1}+27*B_{0,0}+46*B_{0,1}-5*B_{0,2}+\text{offset1})>>\text{shift1}) \tag{49}$$

$$ga_{0,0}=\text{Clip3}(0,(1<<14)-1,(-2*B_{0,-1}+16*B_{0,0}+54*B_{0,1}-4*B_{0,2}+\text{offset1})>>\text{shift1}) \tag{50}$$

$$ha_{0,0}=\text{Clip3}(0,(1<<14)-1,(-B_{0,-1}+8*B_{0,0}+60*B_{0,1}-3*B_{0,2}+\text{offset1})>>\text{shift1}) \tag{51}$$

The samples labeled Xb$_{0,0}$, Xc$_{0,0}$, Xd$_{0,0}$, Xe$_{0,0}$, Xf$_{0,0}$, Xg$_{0,0}$ and Xh$_{0,0}$ for X being replaced by b, c, d, e, f, g and h, respectively, may be derived by first calculating intermediate values denoted as ba$_{i,0}$, ca$_{i,0}$, da$_{i,0}$, ga$_{i,0}$, and ha$_{i,0}$ where i=−1 . . . 2 by applying the 4-tap filter to the nearest integer position samples in vertical direction:

$$ba_{i,0}=-3*B_{0,-1}+60*B_{0,0}+8*B_{0,1}-B_{0,2} \tag{52}$$

$$ca_{i,0}=-4*B_{0,-1}+54*B_{0,0}+16*B_{0,1}-2*B_{0,2} \tag{53}$$

$$da_{i,0}=-5*B_{0,-1}+46*B_{0,0}+27*B_{0,1}-4*B_{0,2} \tag{54}$$

$$ea_{i,0}=-4*B_{0,-1}+36*B_{0,0}+36*B_{0,1}-4*B_{0,2} \tag{55}$$

$$fa_{i,0}=-4*B_{0,-1}+27*B_{0,0}+46*B_{0,1}-5*B_{0,2} \tag{56}$$

$$ga_{i,0}=-2*B_{0,-1}+16*B_{0,0}+54*B_{0,1}-4*B_{0,2} \tag{57}$$

$$ha_{i,0}=-B_{0,-1}+8*B_{0,0}+60*B_{0,1}-3*B_{0,2} \tag{58}$$

The final prediction values Xb$_{0,0}$, Xc$_{0,0}$, Xd$_{0,0}$, Xe$_{0,0}$, Xf$_{0,0}$, Xg$_{0,0}$ and Xh$_{0,0}$ for X being replaced by b, c, d, e, f, g and h, respectively, may be derived by applying the 4-tap filter to the intermediate values Xa$_{i,0}$ where i=−1 . . . 2 in horizontal direction:

$$Xb_{0,0}=\text{Clip3}(0,(1<<14)-1,(-3*Xa_{-1,0}+60*Xa_{0,0}+8*Xa_{1,0}-Xa_{2,0}+\text{offset2})>>\text{shift2}) \tag{59}$$

$$Xc_{0,0}=\text{Clip3}(0,(1<<14)-1,(-4*Xa_{-1,0}+54*Xa_{0,0}+16*Xa_{1,0}-2*Xa_{2,0}+\text{offset2})>>\text{shift2}) \tag{60}$$

$$Xd_{0,0}=\text{Clip3}(0,(1<<14)-1,(-5*Xa_{-1,0}+46*Xa_{0,0}+27*Xa_{1,0}-4*Xa_{2,0}+\text{offset2})>>\text{shift2}) \tag{61}$$

$$Xe_{0,0}=\text{Clip3}(0,(1<<14)-1,(-4*Xa_{-1,0}+36*Xa_{0,0}+36*Xa_{1,0}-4*Xa_{2,0}+\text{offset2})>>\text{shift2}) \tag{62}$$

$$Xf_{0,0}=\text{Clip3}(0,(1<<14)-1,(-4*Xa_{-1,0}+27*Xa_{0,0}+46*Xa_{1,0}-5*Xa_{2,0}+\text{offset2})>>\text{shift2}) \tag{63}$$

$$Xg_{0,0}=\text{Clip3}(0,(1<<14)-1,(-2*Xa_{-1,0}+16*Xa_{0,0}+54*Xa_{1,0}-4*Xa_{2,0}+\text{offset2})>>\text{shift2}) \tag{64}$$

$$Xh_{0,0}=\text{Clip3}(0,(1<<14)-1,(-Xa_{-1,0}+8*Xa_{0,0}+60*Xa_{1,0}-3*Xa_{2,0}+\text{offset2})>>\text{shift2}) \tag{65}$$

According to techniques of this disclosure, to interpolate e$_{0,0}$, f$_{0,0}$, g$_{0,0}$, i$_{0,0}$, j$_{0,0}$, k$_{0,0}$, p$_{0,0}$, q$_{0,0}$ and r$_{0,0}$, a prediction module may perform two stage interpolation filtering (i.e. one filtering operation in the vertical direction and one filtering operation in the horizontal direction). In order to more efficient store intermediate values, it may be desirable to keep intermediate values determined between the two stages to 16 bits. Assume for purposes of explanation that the first stage interpolation filtering is as follows:

$$x=C_1A_1+C_2A_2+C_3A_3+C_4A_4+C_5A_5+C_6A_6+C_7A_7+C_8A_8,$$

where $C_1 \sim C_8$ represent interpolation filter coefficients and $A_1 \sim A_8$ represent full-sample values. The current HEVC interpolation filters generally produce 7-bit gain when the coefficients −1, 4, −11, 40, 40, −11, 4, −1 are used for C1 through C8. Other coefficients may also be used, and other coefficients may similarly result in 7-bit gain. As the input values have positive values of 0-1023 for 10-bit values, the filtered coefficient values are biased towards positive values. The techniques of this disclosure may limit the dynamic range and also at the same time bring the values to 16-bit values. One way of achieving this, potentially without impacting the coding gain, is to right shift the intermediate values by 1 with rounding to get the values into a 16-bit range. If the implementation requires usage of 16-bit values, then these 16-bit range values could be shifted by an offset to fit the values to signed 16-bit values, as shown by the following pseudo code.

```
If (BitDepth_Y - 8) equal to 0, x is a 16 bit value and there is no overflow.
If (BitDepth_Y - 8) equal to 1,
{
    x = x - offset2;
}
If (BitDepth_Y - 8) > 1,
{
    shift = BitDepth_Y - 8 - 1,
    offset1 = 1 << (shift -1)
    x = (x + offset1) >> shift;
    x = x - offset2;
}
```

In this example, x has a 16-bit range, but the values of x may be greater than 16-bits (e.g. 17 bits). To bring 17-bit x values to 16-bits, an appropriate offset (offset2 in the above equations) can be subtracted from x values so that the x values can be stored as 16-bit values. Later, when x values are going to be re-used, this offset can be added back to x to obtain the original value. The range of x values is defined by the difference of the maximum and the minimum value of x. Accordingly, even if a maximum value is a 17-bit value, the range of values between the maximum and the minimum may only be 16 bits.

In this manner, the value of the offset may be a value sufficient to reduce 17-bit values to 16-bit values. The offset may be non-normative, meaning that a particular offset may be implemented by a coding device without regard to a coding standard or bitstream configuration. One video decoder may, for example, use a different offset value than a second video decoder when decoding the same encoded video data.

As the filtered values are shifted by the shift amount, in the second stage filtering the shift amounts of the second stage may be reduced by a shift amount and their corresponding rounding offsets may be adjusted accordingly.

Another alternative to keep precision to 16 bits without requiring offsets, when the data is 17 bits and the range is 16 bits, is to shift right by an extra bit. So the above introduced right shift by one with or without a rounding offset can be replaced by right shift by two with or without rounding. The ordering of filtering may be vertical first followed by horizontal, or vice versa. For the 2D filtering case where after the first stage filtering the intermediate values without the right shifts could overflow 16 bits, currently intermediate values are right shifted by 2. Accordingly, the second stage would have one less right shift to compensate for this extra shift. All this description is for the case where the input samples are 10 bits effectively (bitdepth+bitincrement).

The techniques of this disclosure may also be applied to interpolation using high precision bi-prediction. In such cases, for each prediction direction horizontal filtering followed by vertical filtering (or vice versa) is performed, and the output of the two-stage filtering is kept at a higher precision until the final averaging of the final two predictions. To keep the data in 16-bits after the first stage filtering, the filtered data may be right shifted by 2 bits (with or without rounding). After the second stage, the data may be right shifted by 7 bits to achieve a final 16-bit value. The down shift may be done with or without rounding. This is an alternative to the case described above where a 1-bit shift was applied in the first stage and a 7-bit shift was applied in second stage and an offset was used to move the 17-bit data to 16-bit integer values. Finally, the two prediction directions may be averaged by summing them up and down shifting by 4 with rounding.

For the 8-bit input data, the issue of having data values greater than 16 bits may also arise for the bi-prediction case. In such a case, after the first stage of filtering there may be no need to apply an offset (or for a right shift operation), but after the second stage filtering the data may be down shifted by 6 bits. The final results may be 17-bit values with a 16-bit range. As described above, an offset may be added to the 17-bit values to reduce them to 16-bit values for storage. When retrieved or future calculations, the offset may be added back to the 16-bit values to return them to the original 17-bit values. In some instances, instead of using an offset, intermediate values may be downshifted by 7 bits (with or without a rounding offset). A similar kind of averaging over two prediction directions as in the 10-bit case (sum them up and down shift by 4 with rounding) can be performed.

Another way to keep the intermediate data values within a 16-bit range may be to, after the first stage filtering, right shift the filtered results as follows:

$$\text{shift}=\text{BitDepth}_Y-8,$$

$$x=x>>\text{shift},$$

where there is no rounding offset.
Then, for the second stage filtering, to keep the results within a 16-bit range, values are right shifted by 7 instead of 6 without using rounding offset.

Similar arguments hold for chroma. For 2D filtering of chroma samples maximum gain for chroma interpolation filters is 27+46=73. This for $$da_{i,0} = -5*B_{0,-1}+46*B_{0,0}+27*B_{0,1}-4*B_{0,2} \quad (66)$$

filter. So for 10-bit input the maximum value would be 1023*73. One way to bring down this value to 16-bit range value is to right shift by 1 with or without rounding offset. Alternatively it can be brought down to 16-bit value by right shift by 2 with or without rounding. This extra right shifts will be compensated by shifting by one less after the second stage filtering.

The chroma bi-prediction case may be similar to the luma case described above. In order to have 16-bit values for each list prediction values, after the second stage filtering the sample values may be shifted by one extra bit, hence becoming 7 bits. This extra bit shift will be compensated in the bi-prediction averaging stage.

When bi-prediction is used there may be a possibility of mixing different kinds of prediction to form the final prediction samples. For example, one prediction could be performed using 1D bi-prediction whereas the other may be performed using 2D bi-prediction. With the introduction of extra 1 bit shift to keep the 2D bi-prediction values in 16-bit values, the resolution of 2D bi-prediction and 1D bi-prediction differs. 1D bi-prediction has 1 extra bit precision (there is 4 bit gain (6-bit filter gain−2 bit right shift). 2D bi-prediction has 6+6 gain from 2D filtering−2 bit right shift−7 bit right shift=3 bit gain. To keep all the gains equal it might be good to down shift by 1 extra bit to make them have 3-bit gain similar to 2D bi-prediction case. So 1D bi-prediction samples would be obtained by right shift by 3 instead of 2 (for 10-bit input). Similar case applies to 8-bit input samples. In such a case, 1D bi-prediction samples may be shifted by 1 bit.

The techniques of this disclosure may be implemented in a wide variety of devices or apparatuses, including a wireless handset, and integrated circuit (IC) or a set of ICs (i.e., a chip set). Any components, modules or units have been described provided to emphasize functional aspects and does not necessarily require realization by different hardware units.

Accordingly, the techniques described herein may be implemented in hardware, software, firmware, or any combination thereof. If implemented in hardware, any features described as modules, units or components may be implemented together in an integrated logic device or separately as discrete but interoperable logic devices. If implemented in software, the techniques may be realized at least in part by a computer-readable medium comprising instructions that, when executed in a processor, performs one or more of the methods described above. The computer-readable medium may comprise a non-transitory, computer-readable storage medium and may form part of a computer program product, which may include packaging materials. The computer-readable storage medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates code in the form of instructions or data structures and that can be accessed, read, and/or executed by a computer.

The code may be executed by one or more processors, such as one or more digital signal processors (DSPs), general purpose microprocessors, an application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated software modules or hardware modules configured for encoding and decoding, or incorporated in a combined video codec. Also, the techniques could be fully implemented in one or more circuits or logic elements.

Various aspects of the disclosure have been described. These and other aspects are within the scope of the following claims.

The invention claimed is:

1. A method of coding a block of pixels, comprising:
obtaining, by a video coding device, a block of pixels, wherein the block of pixels includes integer pixel values corresponding to integer pixel positions within the block of pixels;
applying, by the video coding device, a first interpolation filtering operation to a group of integer pixel values associated with the block of pixels to generate a first intermediate pixel value having a first bit depth, wherein the first intermediate pixel value is limited to be within a range of values associated with a second bit depth, and wherein the second bit depth comprises a bit depth value that is smaller than a bit depth value associated with the first bit depth;
adding, by the video coding device, a first offset value to the first intermediate pixel value to generate a second intermediate pixel value at least in part by performing a right-shift operation, wherein adding the first offset value causes the second intermediate pixel value to be a value within the range of values associated with the second bit depth;
storing, by the video coding device, the second intermediate pixel value;
retrieving, by the video coding device, the second intermediate pixel value;
adding, by the video coding device, a second offset value to the retrieved second intermediate value;
applying, by the video coding device, a second interpolation filtering operation to a group of intermediate pixel values comprising the retrieved second intermediate pixel value with the added second offset value to compute a first pixel value for a sub-pixel location; and
generating, by the video coding device, a prediction block based on at least the first pixel value for the sub-pixel location.

2. The method of claim 1, wherein adding, by the video coding device, the second offset value to the retrieved second intermediate value results in the first intermediate value.

3. The method of claim 1, wherein performing the right-shift operation comprises performing a 1-bit right shift operation.

4. The method of claim 1, wherein the second offset value is equal in magnitude to the first offset value.

5. The method of claim 1, wherein the first bit depth of the first intermediate pixel value is equal to 17 bits.

6. The method of claim 1, wherein the second bit depth of the second intermediate pixel value is equal to 16 bits.

7. The method of claim 1, wherein the first pixel value has a bit depth of 17 bits.

8. The method of claim 7, further comprising:
reducing, by the video coding device, the bit depth of the first pixel value to 10 bits.

9. The method of claim 1, wherein each integer pixel value of the group of integer pixel values is a 10-bit integer value.

10. The method of claim 1, wherein the video coding device comprises a video decoder.

11. The method of claim 1, wherein the video coding device comprises a video encoder.

12. A video coding device for coding a block of pixels, the video coding device comprising:
a memory configured to store video data and
a video processor configured to:
obtain a block of pixels, wherein the block of pixels includes integer pixel values corresponding to integer pixel positions within the block of pixels;
apply a first interpolation filtering operation to a group of integer pixel values associated with the block of pixels to generate a first intermediate pixel value having a first bit depth, wherein the first intermediate pixel value is limited to be within a range of values associated with a second bit depth, and wherein the second bit depth comprises a bit depth value that is smaller than a bit depth value associated with the first bit depth;
add a first offset value to the first intermediate pixel value to generate a second intermediate pixel value at least in part by performing a right-shift operation, wherein adding the first offset causes the second intermediate pixel value to be a value within the range of values associated with the second bit depth;
store the second intermediate pixel value;
retrieve the second intermediate pixel value;
add a second offset value to the retrieved second intermediate value;

apply a second interpolation filtering operation to a group of intermediate pixel values comprising the retrieved second intermediate pixel value with the added second offset value to compute a first pixel value for a sub-pixel location; and generate a prediction block based on at least the first pixel value for the sub-pixel location.

13. The video coding device of claim 12, wherein the video processor is configured to add the second offset value to the retrieved second intermediate value such that the addition results in the first intermediate value.

14. The video coding device of claim 12, wherein the video processor is further configured to perform a 1-bit right shift operation.

15. The video coding device of claim 12, wherein the second offset value is equal in magnitude to the first offset value.

16. The video coding device of claim 12, wherein the first bit depth of the first intermediate pixel value is equal to 17 bits.

17. The video coding device of claim 12, wherein the second bit depth of the second intermediate pixel value is equal to 16 bits.

18. The video coding device of claim 12, wherein the first pixel value has a bit depth of 17 bits.

19. The video coding device of claim 18, wherein the video processor is further configured to reduce the bit depth of the first pixel value to 10 bits.

20. The video coding device of claim 12, wherein each integer pixel value of the group of integer pixel values is a1 0-bit integer value.

21. The video coding device of claim 12, wherein the video processor comprises a video decoder.

22. The video coding device of claim 12, wherein the video processor comprises a video encoder.

23. The video coding device of claim 12, wherein the video coding device comprises at least one of:
    a microprocessor; and,
    a wireless communication device that includes the video processor.

24. An apparatus for coding a block of pixels, comprising:
    means for obtaining a block of pixels, wherein the block of pixels includes integer pixel values corresponding to integer pixel positions within the block of pixels;
    means for applying a first interpolation filtering operation to a group of integer pixel values associated with the block of pixels to generate a first intermediate pixel value having a first bit depth, wherein the first intermediate pixel value is limited to be within a range of values associated with a second bit depth, and wherein the second bit depth comprises a bit depth value that is smaller than a bit depth value associated with the first bit depth;
    means for adding a first offset value to the first intermediate pixel value to generate a second intermediate pixel value at least in part by performing a right-shift operation, wherein adding the first offset causes the second intermediate pixel value to be a value within the range of values associated with the second bit depth;
    means for storing the second intermediate pixel value;
    means for retrieving the second intermediate pixel value;
    means for adding a second offset value to the retrieved second intermediate value;
    means for applying a second interpolation filtering operation to a group of intermediate pixel values comprising the retrieved second intermediate pixel value with the added second offset value to compute a first pixel value for a sub-pixel location;
    means for generating a prediction block based on at least the first pixel value for the sub-pixel location.

25. A non-transitory computer readable storage medium storing instructions that upon execution cause one or more processors to:
    obtain a block of pixels, wherein the block of pixels includes integer pixel values corresponding to integer pixel positions within the block of pixels;
    apply a first interpolation filtering operation to a group of integer pixel values associated with the block of pixels to generate a first intermediate pixel value having a first bit depth, wherein the first intermediate pixel value is limited to be within a range of values associated with a second bit depth, and wherein the second bit depth comprises a bit depth value that is smaller than a bit depth value associated with the first bit depth;
    add a first offset value to the first intermediate pixel value to generate a second intermediate pixel value at least in part by performing a right-shift operation, wherein adding the first offset value causes the second intermediate value to be a value within the range of values associated with the second bit depth;
    store the second intermediate pixel value;
    retrieve the second intermediate pixel value;
    add a second offset value to the retrieved second intermediate value;
    apply a second interpolation filtering operation to a group of intermediate pixel values comprising the retrieved second intermediate pixel value with the added second offset value to compute a first pixel value for a sub-pixel location;
    generate a prediction block based on at least the first pixel value for the sub-pixel location.

* * * * *